(12) United States Patent  (10) Patent No.: US 9,167,174 B1
Rivard et al.  (45) Date of Patent: Oct. 20, 2015

(54) SYSTEMS AND METHODS FOR HIGH-DYNAMIC RANGE IMAGES

(71) Applicant: Duelight LLC, Sunnyvale, CA (US)

(72) Inventors: William Rivard, Menlo Park, CA (US);
Adam Feder, Mountain View, CA (US);
Brian Kindle, Sunnyvale, CA (US)

(73) Assignee: Duelight LLC, Sunnyvale, CA (US)

( * ) Notice: Subject to any disclaimer, the term of this patent is extended or adjusted under 35 U.S.C. 154(b) by 0 days.

(21) Appl. No.: 14/534,068

(22) Filed: Nov. 5, 2014

(51) Int. Cl.
*H04N 5/235* (2006.01)
*H04N 5/217* (2011.01)
*H04N 5/262* (2006.01)
*H04N 5/232* (2006.01)
*G06T 5/00* (2006.01)

(52) U.S. Cl.
CPC .............. *H04N 5/2355* (2013.01); *G06T 5/009* (2013.01); *H04N 5/23216* (2013.01); *G06T 2207/10004* (2013.01); *G06T 2207/20208* (2013.01)

(58) Field of Classification Search
None
See application file for complete search history.

(56) References Cited

U.S. PATENT DOCUMENTS

| | | | |
|---|---|---|---|
| 5,818,977 | A | 10/1998 | Tansley |
| 6,243,430 | B1 | 6/2001 | Mathe |
| 6,498,926 | B1 | 12/2002 | Ciccarelli et al. |
| 7,256,381 | B2 | 8/2007 | Asaba |
| 7,760,246 | B2 | 7/2010 | Dalton et al. |
| 8,761,245 | B2 | 6/2014 | Puri et al. |
| 8,976,264 | B2 | 3/2015 | Rivard et al. |
| 2003/0015645 | A1 | 1/2003 | Brickell et al. |
| 2003/0142745 | A1 | 7/2003 | Osawa |
| 2006/0050165 | A1 | 3/2006 | Amano |
| 2006/0245014 | A1 | 11/2006 | Haneda |
| 2007/0025714 | A1 | 2/2007 | Shiraki |
| 2007/0030357 | A1 | 2/2007 | Levien et al. |
| 2007/0242900 | A1 | 10/2007 | Chen et al. |
| 2008/0030592 | A1 | 2/2008 | Border et al. |
| 2008/0158398 | A1 | 7/2008 | Yaffe et al. |
| 2008/0192064 | A1* | 8/2008 | Hong et al. .................... 345/582 |
| 2009/0066782 | A1 | 3/2009 | Choi et al. |
| 2009/0153245 | A1 | 6/2009 | Lee |
| 2009/0295941 | A1 | 12/2009 | Nakajima et al. |
| 2010/0118204 | A1 | 5/2010 | Proca et al. |
| 2010/0194851 | A1* | 8/2010 | Pasupaleti et al. .............. 348/36 |
| 2010/0208099 | A1 | 8/2010 | Nomura |
| 2010/0302603 | A1 | 12/2010 | Ayers et al. |
| 2011/0019051 | A1 | 1/2011 | Yin et al. |
| 2011/0090385 | A1 | 4/2011 | Aoyama et al. |
| 2011/0115971 | A1 | 5/2011 | Furuya et al. |
| 2011/0134267 | A1 | 6/2011 | Ohya |
| 2011/0194618 | A1 | 8/2011 | Gish et al. |

(Continued)

OTHER PUBLICATIONS

Non-Final Office Action from U.S. Appl. No. 13/573,252, dated Jul. 10, 2014.

(Continued)

*Primary Examiner* — Aung S Moe
*Assistant Examiner* — Euel Cowan
(74) *Attorney, Agent, or Firm* — Zilka-Kotab, PC

(57) ABSTRACT

A system, method, and computer program product are provided for high-dynamic range images. In use, a first pixel attribute of a first pixel is received and a second pixel attribute of a second pixel is received. Next, a scalar based on the first pixel attribute and the second pixel attribute is identified. Finally, the first pixel and the second pixel are blended, based on the scalar, wherein the first pixel is brighter than the second pixel. Additional systems, methods, and computer program products are also presented.

20 Claims, 22 Drawing Sheets

(56) References Cited

U.S. PATENT DOCUMENTS

| | | |
|---|---|---|
| 2011/0242334 A1 | 10/2011 | Wilburn et al. |
| 2011/0280541 A1 | 11/2011 | Lee |
| 2012/0002089 A1 | 1/2012 | Wang et al. |
| 2012/0033118 A1 | 2/2012 | Lee et al. |
| 2012/0069213 A1 | 3/2012 | Jannard et al. |
| 2012/0162465 A1 | 6/2012 | Culbert et al. |
| 2012/0262600 A1 | 10/2012 | Velarde et al. |
| 2012/0314100 A1 | 12/2012 | Frank |
| 2013/0107062 A1 | 5/2013 | Okazaki |
| 2013/0114894 A1* | 5/2013 | Yadav et al. .................. 382/167 |
| 2013/0147979 A1 | 6/2013 | McMahon et al. |
| 2013/0176458 A1 | 7/2013 | Van Dalen et al. |
| 2013/0223530 A1 | 8/2013 | Demos |
| 2013/0271631 A1 | 10/2013 | Tatsuzawa et al. |
| 2013/0279584 A1 | 10/2013 | Demos |
| 2013/0301729 A1 | 11/2013 | Demos |
| 2013/0335596 A1 | 12/2013 | Demandolx et al. |
| 2014/0098248 A1 | 4/2014 | Okazaki |
| 2014/0176757 A1 | 6/2014 | Rivard et al. |
| 2014/0211852 A1 | 7/2014 | Demos |
| 2014/0244858 A1 | 8/2014 | Okazaki |
| 2014/0247979 A1 | 9/2014 | Roffet et al. |
| 2014/0300795 A1 | 10/2014 | Bilcu et al. |
| 2015/0005637 A1 | 1/2015 | Stegman et al. |
| 2015/0092852 A1 | 4/2015 | Demos |
| 2015/0098651 A1 | 4/2015 | Rivard et al. |

OTHER PUBLICATIONS

Notice of Allowance from U.S. Appl. No. 13/573,252, dated Oct. 22, 2014.
Feder et al., U.S. Appl. No. 13/999,678, filed Mar. 14, 2014.
Rivard, W. et al., U.S. Appl. No. 14/568,045, filed Dec. 11, 2014.
Restriction Requirement from U.S. Appl. No. 14/568,045, dated Jan. 15, 2015.
Rivard, W. et al., U.S. Appl. No. 14/534,079, filed Nov. 5, 2014.
Non-Final Office Action from U.S. Appl. No. 14/534,079, dated Jan. 29, 2015.
Rivard, W. et al., U.S. Appl. No. 14/534,089, filed Nov. 5, 2014.
Non-Final Office Action from U.S. Appl. No. 14/534,089, dated Feb. 25, 2015.
Rivard, W. et al., U.S. Appl. No. 14/535,274, filed Nov. 6, 2014.
Non-Final Office Action from U.S. Appl. No. 14/535,274, dated Feb. 3, 2015.
Rivard, W. et al., U.S. Application No. 14/535,279, filed Nov. 6, 2014.
Non-Final Office Action from U.S. Appl. No. 14/535,279, dated Feb. 5, 2015.
Rivard, W. et al., U.S. Appl. No. 14/535,282, filed Nov. 6, 2014.
Non-Final Office Action from U.S. Appl. No. 14/535,282, dated Jan. 30, 2015.
Non-Final Office Action from U.S. Appl. No. 14/536,524, dated Mar. 3, 2015.
Rivard, W. et al., U.S. Appl. No. 14/536,524, filed Nov. 7, 2014.
Notice of Allowance from U.S. Appl. No. 13/753,252, dated Oct. 22, 2014.
Non-Final Office Action from U.S. Appl. No. 14/568,045, dated Mar. 24, 2015.
Rivard, W. et al., U.S. Appl. No. 14/702,549, filed May 1, 2015.
Notice of Allowance from U.S. Appl. No. 14/534,079, dated May 11, 2015.
Notice of Allowance from U.S. Appl. No. 14/535,274, dated May 26, 2015.
Notice of Allowance from U.S. Appl. No. 14/534,089, dated Jun. 23, 2015.
Notice of Allowance from U.S. Appl. No. 14/535,282, dated Jun. 23, 2015.
Notice of Allowance from U.S. Appl. No. 14/536,524, dated Jun. 29, 2015.
Notice of Allowance from U.S. Appl. No. 14/535,279, dated Aug. 31, 2015.

* cited by examiner

SYSTEMS AND METHODS FOR HIGH-DYNAMIC RANGE IMAGES

RELATED APPLICATIONS

This application is related to the following U.S. patent application, the entire disclosures being incorporated by reference herein: application Ser. No. 13/573,252, filed Sep. 4, 2012, entitled "IMPROVED COLOR BALANCE IN DIGITAL PHOTOGRAPHY."

FIELD OF THE INVENTION

The present invention relates to digital photographic systems, and more particularly to systems and methods for high-dynamic range images.

BACKGROUND

Traditional digital photography systems are inherently limited by the dynamic range of a capturing image sensor. One solution to such limitation is the use of high dynamic-range (HDR) photography. HDR photography involves capturing multiple exposures of a same scene, where each of the exposures is metered differently, and then merging the multiple captures to create an image with a larger dynamic range.

SUMMARY

A system, method, and computer program product are provided for high-dynamic range images. In use, a first pixel attribute of a first pixel is received and a second pixel attribute of a second pixel is received. Next, a scalar based on the first pixel attribute and the second pixel attribute is identified. Finally, the first pixel and the second pixel are blended, based on the scalar, wherein the first pixel is brighter than the second pixel. Additional systems, methods, and computer program products are also presented.

DETAILED DESCRIPTION

Figure 1:
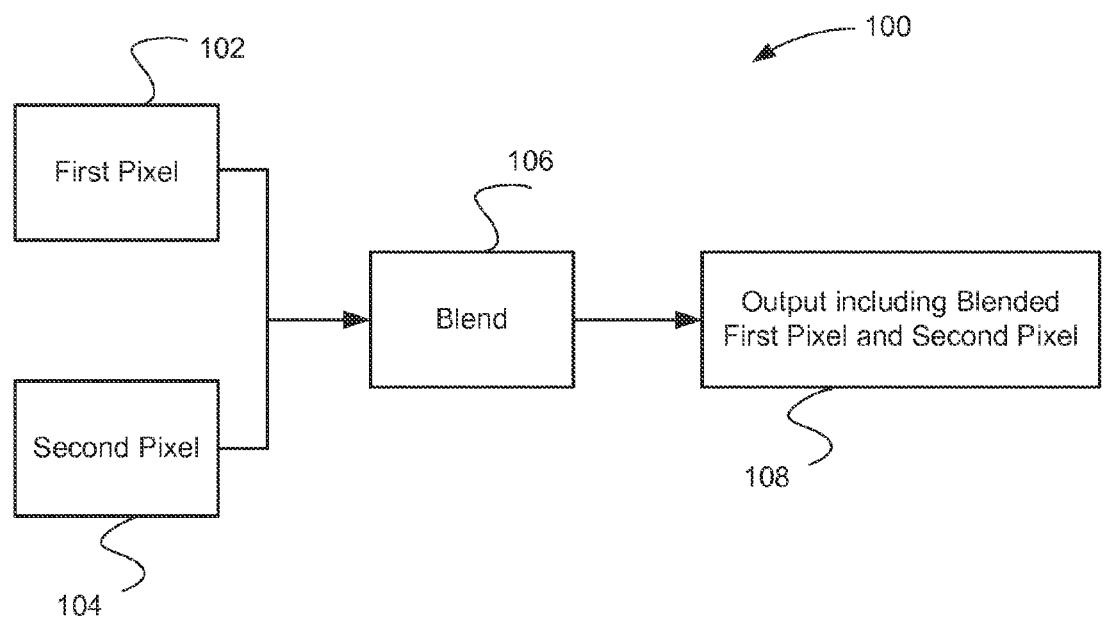
FIG. 1 illustrates an exemplary system for outputting a blended brighter and a darker pixel, in accordance with one possible embodiment.

FIG. 1 illustrates an exemplary system 100 for outputting a blended brighter and a darker pixel, in accordance with one possible embodiment. As an option, the system 100 may be implemented in the context of any of the Figures. Of course, however, the system 100 may be carried out in any desired environment. Further, the aforementioned definitions may equally apply to the description below.

As shown, the system 100 includes a first pixel 102 and a second pixel 104. In one embodiment, the first pixel may be associated with a brighter pixel, and the second pixel may be associated with a darker pixel. In the context of the present description, a brighter pixel includes any pixel that is brighter than a corresponding darker pixel, and a darker pixel includes any pixel that is darker than a corresponding brighter pixel. A brighter pixel may be associated with an image having brighter overall exposure, and a corresponding darker pixel may be associated with an image having a darker overall exposure. In various embodiments, brighter and darker pixels may be computed by combining other corresponding pixels based on intensity, exposure, color attributes, saturation, and/or any other image or pixel parameter.

In one embodiment, a brighter pixel and a darker pixel may be associated with a brighter pixel attribute and a darker pixel attribute, respectively. In various embodiments, a pixel attribute (e.g. for a brighter pixel attribute, for a darker pixel attribute, etc.) may include an intensity, a saturation, a hue, a color space value (e.g. EGB, YCbCr, YUV, etc.), a brightness, an RGB color, a luminance, a chrominance, and/or any other feature which may be associated with a pixel in some manner.

Additionally, the first pixel 102 and the second pixel 104 are inputs to a blend process 106. In one embodiment, the blending may be based on one or more features associated with the pixels. For example, blending may include a spatial positioning feature wherein the pixel of the brighter pixel is aligned with a corresponding pixel of the darker pixel. Of course, any other relevant techniques known in the art may be used to align corresponding pixels on more than one image.

In other embodiments, various techniques to blend may be used, including taking an average of two or more pixel points, summing and normalizing a color attribute associated with each pixel point (e.g. a summation of a red/green/blue component in a RGB color space, etc.), determining a RGB (or any color space) vector length which may then be normalized, using an average pixel point in combination with a brighter pixel or a darker pixel, and/or using any other combination to blend two or more pixel points. In one embodiment, blending may occur independent of any color values or color spaces. In another embodiment, blending may include mixing two or more pixel points. In a specific embodiment, blending may include an OpenGL (or any vector rendering application) Mix operation whereby the operation linearly interpolates between two input values.

In one embodiment, blending may occur automatically or may be based on user input. For example, in some embodiments, the blending may occur automatically based on one or more set targets, including, for example, a set exposure point, a set focus value, a set temperature (e.g. Kelvin scale, etc.), a predetermined white point value, a predetermined color saturation value, a predetermined normalizing value (e.g. for color space characteristics, etc.), a predetermined levels value, a predetermined curves value, a set black point, a set white point, a set median value point, and/or any other feature of the pixel or image which may be used as a basis for blending. In other embodiments, features associated with the camera may be used as a basis for determining one or more automatic values. For example, a camera may include metadata associated with the pixels, including the ISO value, an exposure value, an aperture value, a histogram distribution, a geo positioning coordinate, an identification of the camera, an identification of the lens, an identification of the user of the camera, the time of day, and/or any other value which may be associated with the camera. In one embodiment, the metadata associated with the pixels may be used to set one or more automatic points for automatically blending.

In one embodiment, such automatic features may be inputted or based, at least in part, on cloud-based input or feedback. For example, a user may develop a set of batch rules or a package of image settings which should be applied to future images. Such settings can be saved to the cloud and/or to any other memory device which can subsequently be accessed by the camera device or module. As an example, a user may use a mobile device for taking and editing photos. Based on such past actions taken (e.g. with respect to editing the pixels or images, etc.), the user may save such actions as a package to be used for future images or pixels received. In other embodiments, the mobile device may recognize and track such actions taken by the user and may prompt the user to save the actions as a package to be applied for future received images or pixels.

In other embodiments, a package of actions or settings may also be associated with third party users. For example, such packages may be received from an online repository (e.g. associated with users on a photo sharing site, etc.), or may be transferred device-to-device (e.g. Bluetooth, NFC, Wifi, Wifi-direct, etc.). In one embodiment, a package of actions or settings may be device specific. For example, a specific device may be known to overexpose images or tint images and the package of actions or settings may be used to correct a deficiency associated with the device, camera, or lens. In other embodiments, known settings or actions may be improved upon. For example, the user may wish to create a black and white to mimic an Ansel Adams type photograph. A collection of settings or actions may be applied which is based on the specific device receiving the pixels or images (e.g. correct for deficiencies in the device, etc.), feedback from the community on how to achieve the best looking Ansel Adams look (e.g. cloud based feedback, etc.), and/or any other information which may be used to create the Ansel Adams type photograph.

In a separate embodiment, the blending may occur based on user input. For example, a number of user interface elements may be displayed to the user on a display, including an element for controlling overall color of the image (e.g. sepia, graytone, black and white, etc.), a package of target points to create a feel (e.g. a Polaroid feel package would have higher exposure with greater contrast, an intense feel package which would increase the saturation levels, etc.), one or more selective colors of an image (e.g. only display one or more colors such as red, blue, yellow, etc.), a saturation level, an exposure level, an ISO value, a black point, a white point, a levels value, a curves value, and/or any other point which may be associated with the image or pixel. In various embodiments, a user interface element may be used to control multiple values or points (e.g. one sliding element controls a package of settings, etc.), or may also be used to allow the user to control each and every element associated with the image or pixel.

Of course, in other embodiments, the blending may occur based on one or more automatic settings and on user input. For example, pixels or images may be blended first using one or more automatic settings, after which the user can then modify specific elements associated with the image. In other embodiments, any combination of automatic or manual settings may be applied to the blending.

In various embodiments, the blending may include mixing one or more pixels. In other embodiments, the blending may be based on a row of pixels (i.e. blending occurs row by row, etc.), by an entire image of pixels (e.g. all rows and columns of pixels, etc.), and/or in any manner associated with the pixels.

In one embodiment, the blend between two or more pixels may include applying an alpha blend. Of course, in other embodiments, any process for combining two or more pixels may be used to create a final resulting image.

As shown, after the blend process, an output 108 includes a blended first pixel and a second pixel. In one embodiment, the output may include a blended brighter and darker pixel. Additionally, the first pixel may be brighter than the second pixel.

In one embodiment, the blending of a brighter pixel and a darker pixel may result in a high dynamic range (HDR) pixel as an output. In other embodiments, the output may include a brighter pixel blended with a medium pixel to provide a first resulting pixel. The brighter pixel may be characterized by a brighter pixel attribute and the medium pixel may be characterized by a medium pixel attribute. The blend operation between the brighter pixel and the medium pixel may be based on a scalar result from a first mix value function that receives the brighter pixel attribute and the medium pixel attribute. In a further embodiment, the output may include a medium pixel blended with a darker pixel to provide a second resulting pixel. The darker pixel may be characterized by a darker pixel attribute. The blend operation between the medium pixel and the darker pixel may be based on a scalar result from a second mix value function that receives the medium pixel attribute and the darker pixel attribute. Further, in one embodiment, a scalar may be identified based on a mix value function that receives as inputs the first (e.g. brighter, etc.) pixel attribute and the second (e.g. darker, etc.) pixel attribute. The scalar may provide a blending weight between two different pixels (e.g. between brighter and medium, or between medium and darker). Lastly, in one embodiment, a mix value function (e.g. the first mix value function and the second mix value function) may include a flat region, a transition region, and a saturation region corresponding to thresholds associated with the inputs.

In one embodiment, the output may be based on a mix value surface associated with two or more pixels. For example, in one embodiment, a blending may create an intermediary value which is then used to output a final value associated with two or more pixels. In such an embodiment, the intermediary value (e.g. between two or more pixels, etc.) may be used to compute a value associated with a three-dimensional (3D) surface. The resulting pixel may be associated with the value computed using the intermediary value. Of course, in a variety of embodiments, the output may be associated with any type of functions, and any number of dimensions or inputs.

Figure 2:
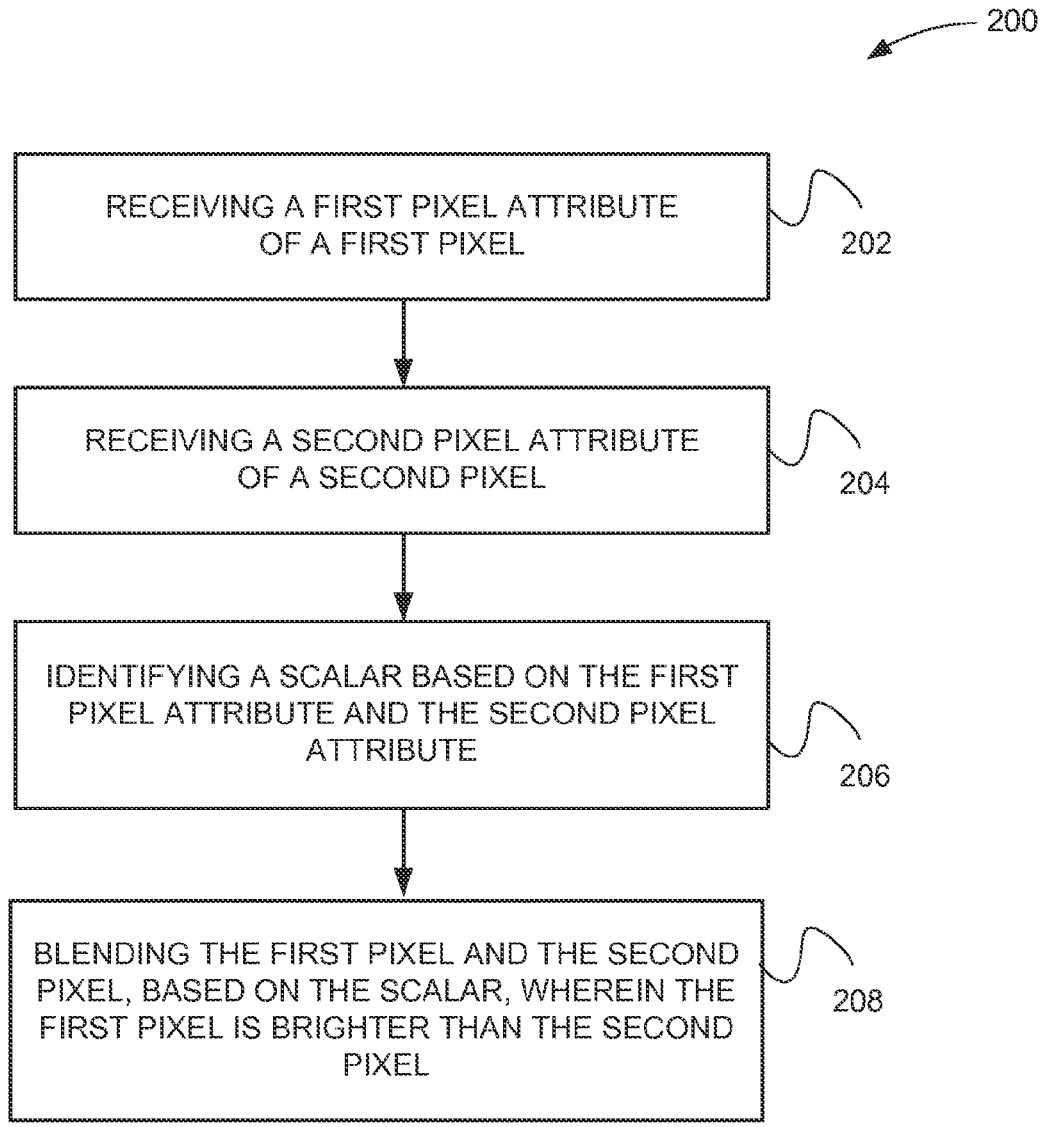
FIG. 2 illustrates a method for blending a brighter pixel and a darker pixel, in accordance with one embodiment.

FIG. 2 illustrates a method 200 for blending a brighter pixel and a darker pixel, in accordance with one embodiment. As an option, the method 200 may be implemented in the context of any of the Figures. Of course, however, the method 200 may be carried out in any desired environment. Further, the aforementioned definitions may equally apply to the description below.

As shown, a first pixel attribute of a first pixel is received. See operation 202. Additionally, a second pixel attribute of a second pixel is received. See operation 204. In one embodiment, the first pixel attribute may correspond with a brighter pixel attribute, the first pixel may correspond with a brighter pixel, the second pixel attribute may correspond with a darker pixel attribute, and the second pixel may correspond with a darker pixel.

In one embodiment, a brighter pixel attribute and a darker pixel attribute each may include an intensity. In one embodiment, the intensity may correspond to a first value of a numeric range (e.g. 0.0 to 1.0) for the first pixel, and a second value of the numeric range for the second pixel. In other embodiments, a first (e.g. brighter, etc.) pixel attribute and a second (e.g. darker, etc.) pixel attribute each may include a saturation, a hue, a color space value (e.g. EGB, YCbCr, YUV, etc.), a brightness, hue, an RGB color, a luminance, a chrominance, and/or any other feature which may be associated with a pixel in some manner.

In another embodiment, a medium pixel attribute of a medium pixel that may be darker than a brighter pixel and brighter than a darker pixel, may be received. In another embodiment, a dark exposure parameter and a bright exposure parameter may be estimated, wherein the bright exposure parameter may be used for receiving the first (e.g. brighter, etc.) pixel attribute of the first (e.g. brighter, etc.) pixel, and the second (e.g. dark, etc.) exposure parameter may be used for receiving the second (e.g. darker, etc.) pixel attribute of the darker pixel. Further, in another embodiment, the dark exposure parameter and the bright exposure parameter may be associated with an exposure time. Still yet, in one embodiment, a medium exposure parameter may be estimated, wherein the medium exposure parameter is used for receiving a medium pixel attribute of a medium pixel.

In an additional embodiment, a medium pixel attribute of a medium pixel may be received, wherein a brighter pixel is associated with a first value, a darker pixel is associated with a second value, and a medium pixel is associated with a third value, the third value being in between the first value and the second value. Additionally, a first resulting pixel may include a first HDR pixel, and a second resulting pixel may include a second HDR pixel, such that the combined pixel may be generated by combining the first HDR pixel and the second HDR pixel based on a predetermined function to generate the combined pixel which may include a third HDR pixel.

As shown, a scalar is identified based on the first pixel attribute and the second pixel attribute. See operation 206.

In various embodiments, the scalar may be identified by generating, selecting, interpolating, and/or any other operation which may result in a scalar. In a further embodiment, the scalar may be identified utilizing one or more polynomials.

In one embodiment, a first one of the polynomials may have a first order that may be different than a second order of a second one of the polynomials. In another embodiment, a first polynomial of the plurality of polynomials may be a function of the first (e.g. brighter, etc.) pixel attribute and a second polynomial of the plurality of polynomials may be a function of the second (e.g. darker, etc.) pixel attribute. Still yet, in another embodiment, a first one of the polynomials may be a function of a brighter pixel attribute and may have a first order that may be less than a second order of a second one of the polynomials that may be a function of the darker pixel attribute. Additionally, in one embodiment, the first polynomial may be at least one of a higher order, an equal order, or a lower order relative to the second polynomial.

As shown, blending the first pixel and the second pixel may be based on the scalar, wherein the first pixel is brighter than the second pixel. See operation 208.

In another embodiment, a scalar may be identified based on either a polynomial of the form $z=1-(1-(1-x)^A)^B)*((1-(1-y)^C)^D)$ or a polynomial of the form $z=((1-(1-x)^A)^B)*((1-(1-y)^C)^D)$, where z corresponds to the scalar, x corresponds to the second (e.g. darker, etc.) pixel attribute, y corresponds to the (e.g. brighter, etc.) first pixel attribute, and A, B, C, D correspond to arbitrary constants.

In one embodiment, the blending of a first (e.g. brighter, etc.) pixel and a second (e.g. darker, etc.) pixel may result in a high dynamic range (HDR) pixel as an output. In other embodiments, the blending may include identifying a first scalar based on the brighter pixel attribute and the medium pixel attribute, the first scalar being used for blending the brighter pixel and the medium pixel to provide a first resulting pixel. Additionally, in one embodiment, a second scalar based on the medium pixel attribute and the darker pixel attribute, the second scalar being used for blending the medium pixel and the darker pixel to provide a second resulting pixel.

In one embodiment, a third pixel attribute of a third pixel may be received. Additionally, a second scalar based on the second pixel attribute and the third pixel attribute may be identified. Further, based on the second scalar, the second pixel and the third pixel may be blended. Still yet, a first resulting pixel based on the blending of the first pixel and the second pixel may be generated, and a second resulting pixel based on the blending of the second pixel and the third pixel may be generated.

Additionally, in various embodiments, the first resulting pixel and the second resulting pixel are combined resulting in a combined pixel. Further, in one embodiment, the combined pixel may be processed based on an input associated with an intensity, a saturation, a hue, a color space value (e.g. RGB, YCbCr, YUV, etc.), a brightness, an RGB color, a luminance, a chrominance, and/or any other feature associated with the combined pixel. In a further embodiment, the combined pixel may be processed based on a saturation input or level mapping input.

In one embodiment, level mapping (or any input) may be performed on at least one pixel subject to the blending. In various embodiments, the level mapping (or any input) may occur in response to user input (e.g. selection of an input and/or a value associated with an input, etc.). Of course, the level mapping (or any input) may occur automatically based on a default value or setting, feedback from a cloud-based source (e.g. cloud source best settings for a photo effect, etc.), feedback from a local device (e.g. based on past photos taken by the user and analyzed the user's system, based on photos taken by others including the user within a set geographic proximity, etc.), and/or any other setting or value associated with an automatic action. In one embodiment, the level mapping may comprise an equalization operation, such as an equalization technique known in the art as contrast limited adaptive histogram equalization (CLAHE).

In some embodiments, one or more user interfaces and user interface elements may be used to receive a user input. For example, in one embodiment, a first indicia corresponding to at least one brighter point and a second indicia corresponding to at least one brighter point may be displayed, and the user input may be further capable of including manipulation of at least one of the first indicia or the second indicia. Additionally, in one embodiment, third indicia corresponding to at least one medium point may be displayed, and the user input may be further capable of including manipulation of the third indicia.

In another embodiment, a first one of the polynomials may be a function of a first pixel attribute, and a second one of the polynomials may be a function of a second pixel attribute, and the resulting pixel may be a product of the first and second polynomials. Still yet, in one embodiment, the resulting pixel may be a product of the first and second polynomials in combination with a strength function.

Additionally, in one embodiment, a strength function and/or coefficient may control a function operating on two or more pixels, including the blending (e.g. mixing, etc.) of the two or more pixels. For example, in various embodiments, the strength function may be used to control the blending of the two or more pixels, including providing no HDR effect (e.g. evO, etc.), a full HDR effect, or even an amplification of the HDR effect. In this manner, the strength function may control the resulting pixel based on the first and second polynomials.

In another embodiment, the blending may include at one or more stages in the blending process. For example, in one embodiment, the first polynomial may be based on a single pixel attribute and the second polynomial may be based on a second single pixel attribute, and blending may include taking an average based on the first and second polynomials. In another embodiment, the first polynomial and the second polynomial may be based on an average of many pixel attributes (e.g. multiple exposures, multiple saturations, etc.), and the blending may include taking an average based on the first and second polynomials.

Of course, in one embodiment, the polynomials may be associated with a surface diagram. For example, in one embodiment, an x value may be associated with a polynomial associated with the first pixel attribute (or a plurality of pixel attributes), and a y value may be associated with a polynomial associated with the second pixel attribute (or a plurality of pixel attributes). Further, in another embodiment, a z value may be associated with a strength function. In one embodiment, a resulting pixel value may be determined by blending the x value and y value based on the z value, as determined by the surface diagram.

In an alternative embodiment, a resulting pixel value may be selected from a table that embodies the surface diagram. In another embodiment, a first value associated with a first polynomial and a second value associated with a second polynomial may each be used to select a corresponding value from a table, and the two values may be used to interpolate a resulting pixel.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3A:
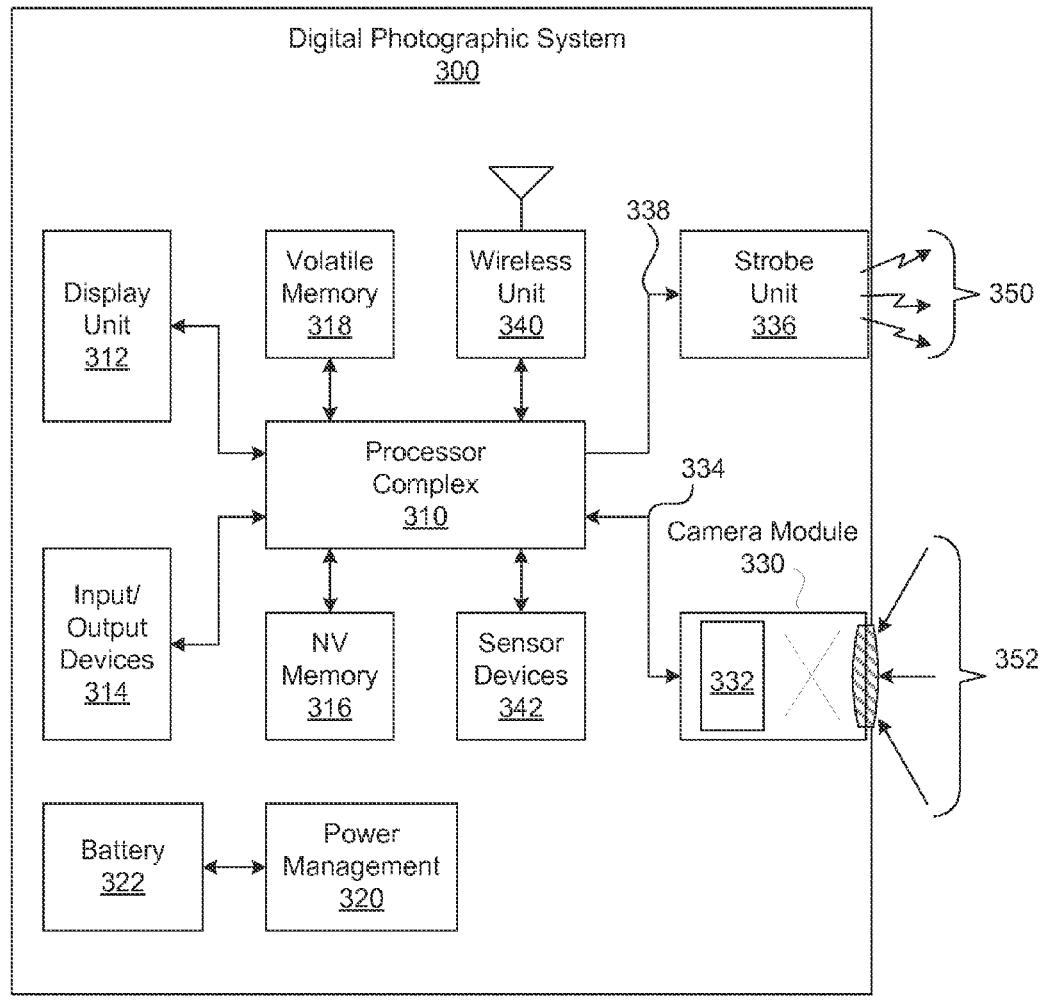
FIG. 3A illustrates a digital photographic system, in accordance with an embodiment.

FIG. 3A illustrates a digital photographic system 300, in accordance with one embodiment. As an option, the digital photographic system 300 may be implemented in the context of the details of any of the Figures disclosed herein. Of course, however, the digital photographic system 300 may be implemented in any desired environment. Further, the aforementioned definitions may equally apply to the description below.

As shown, the digital photographic system 300 may include a processor complex 310 coupled to a camera module 330 via an interconnect 334. In one embodiment, the processor complex 310 is coupled to a strobe unit 336. The digital photographic system 300 may also include, without limitation, a display unit 312, a set of input/output devices 314, non-volatile memory 316, volatile memory 318, a wireless unit 340, and sensor devices 342, each coupled to the processor complex 310. In one embodiment, a power management subsystem 320 is configured to generate appropriate power supply voltages for each electrical load element within the digital photographic system 300. A battery 322 may be configured to supply electrical energy to the power management subsystem 320. The battery 322 may implement any technically feasible energy storage system, including primary or rechargeable battery technologies. Of course, in other embodiments, additional or fewer features, units, devices, sensors, or subsystems may be included in the system.

In one embodiment, a strobe unit 336 may be integrated into the digital photographic system 300 and configured to provide strobe illumination 350 during an image sample event performed by the digital photographic system 300. In another embodiment, a strobe unit 336 may be implemented as an independent device from the digital photographic system 300 and configured to provide strobe illumination 350 during an image sample event performed by the digital photographic system 300. The strobe unit 336 may comprise one or more LED devices, a gas-discharge illuminator (e.g. a Xenon strobe device, a Xenon flash lamp, etc.), or any other technically feasible illumination device. In certain embodiments, two or more strobe units are configured to synchronously generate strobe illumination in conjunction with sampling an image. In one embodiment, the strobe unit 336 is controlled through a strobe control signal 338 to either emit the strobe illumination 350 or not emit the strobe illumination 350. The strobe control signal 338 may be implemented using any technically feasible signal transmission protocol. The strobe control signal 338 may indicate a strobe parameter (e.g. strobe intensity, strobe color, strobe time, etc.), for directing the strobe unit 336 to generate a specified intensity and/or color of the strobe illumination 350. The strobe control signal 338 may be generated by the processor complex 310, the camera module 330, or by any other technically feasible combination thereof. In one embodiment, the strobe control signal 338 is generated by a camera interface unit within the processor complex 310 and transmitted to both the strobe unit 336 and the camera module 330 via the interconnect 334. In another embodiment, the strobe control signal 338 is generated by the camera module 330 and transmitted to the strobe unit 336 via the interconnect 334.

Optical scene information 352, which may include at least a portion of the strobe illumination 350 reflected from objects in the photographic scene, is focused as an optical image onto an image sensor 332 within the camera module 330. The image sensor 332 generates an electronic representation of the optical image. The electronic representation comprises spatial color intensity information, which may include different color intensity samples (e.g. red, green, and blue light, etc.). In other embodiments, the spatial color intensity information may also include samples for white light. The electronic representation is transmitted to the processor complex 310 via the interconnect 334, which may implement any technically feasible signal transmission protocol.

In one embodiment, input/output devices 314 may include, without limitation, a capacitive touch input surface, a resistive tablet input surface, one or more buttons, one or more knobs, light-emitting devices, light detecting devices, sound emitting devices, sound detecting devices, or any other technically feasible device for receiving user input and converting the input to electrical signals, or converting electrical signals into a physical signal. In one embodiment, the input/output devices 314 include a capacitive touch input surface coupled to a display unit 312. A touch entry display system may include the display unit 312 and a capacitive touch input surface, also coupled to processor complex 310.

Additionally, in other embodiments, non-volatile (NV) memory 316 is configured to store data when power is interrupted. In one embodiment, the NV memory 316 comprises one or more flash memory devices (e.g. ROM, PCM, FeRAM, FRAM, PRAM, MRAM, NRAM, etc.). The NV memory 316 comprises a non-transitory computer-readable medium, which may be configured to include programming instructions for execution by one or more processing units within the processor complex 310. The programming instructions may implement, without limitation, an operating system (OS), UI software modules, image processing and storage software modules, one or more input/output devices 314 connected to the processor complex 310, one or more software modules for sampling an image stack through camera module 330, one or more software modules for presenting the image stack or one or more synthetic images generated from the image stack through the display unit 312. As an example, in one embodiment, the programming instructions may also implement one or more software modules for merging images or portions of images within the image stack, aligning at least portions of each image within the image stack, or a combination thereof. In another embodiment, the processor complex 310 may be configured to execute the programming instructions, which may implement one or more software modules operable to create a high dynamic range (HDR) image.

Still yet, in one embodiment, one or more memory devices comprising the NV memory 316 may be packaged as a module configured to be installed or removed by a user. In one embodiment, volatile memory 318 comprises dynamic random access memory (DRAM) configured to temporarily store programming instructions, image data such as data associated with an image stack, and the like, accessed during the course of normal operation of the digital photographic system 300. Of course, the volatile memory may be used in any manner and in association with any other input/output device 314 or sensor device 342 attached to the process complex 310.

In one embodiment, sensor devices 342 may include, without limitation, one or more of an accelerometer to detect motion and/or orientation, an electronic gyroscope to detect motion and/or orientation, a magnetic flux detector to detect orientation, a global positioning system (GPS) module to detect geographic position, or any combination thereof. Of course, other sensors, including but not limited to a motion detection sensor, a proximity sensor, an RGB light sensor, a gesture sensor, a 3-D input image sensor, a pressure sensor, and an indoor position sensor, may be integrated as sensor devices. In one embodiment, the sensor devices may be one example of input/output devices 314.

Wireless unit 340 may include one or more digital radios configured to send and receive digital data. In particular, the wireless unit 340 may implement wireless standards (e.g. WiFi. Bluetooth, NFC, etc.), and may implement digital cellular telephony standards for data communication (e.g. CDMA, 3G, 4G, LTE, LTE-Advanced, etc.). Of course, any wireless standard or digital cellular telephony standards may be used.

In one embodiment, the digital photographic system 300 is configured to transmit one or more digital photographs to a network-based (online) or "cloud-based" photographic media service via the wireless unit 340. The one or more digital photographs may reside within either the NV memory 316 or the volatile memory 318, or any other memory device associated with the processor complex 310. In one embodiment, a user may possess credentials to access an online photographic media service and to transmit one or more digital photographs for storage to, retrieval from, and presentation by the online photographic media service. The credentials may be stored or generated within the digital photographic system 300 prior to transmission of the digital photographs. The online photographic media service may comprise a social networking service, photograph sharing service, or any other network-based service that provides storage of digital photographs, processing of digital photographs, transmission of digital photographs, sharing of digital photographs, or any combination thereof. In certain embodiments, one or more digital photographs are generated by the online photographic media service based on image data (e.g. image stack, HDR image stack, image package, etc.) transmitted to servers associated with the online photographic media service. In such embodiments, a user may upload one or more source images from the digital photographic system 300 for processing by the online photographic media service.

In one embodiment, the digital photographic system 300 comprises at least one instance of a camera module 330. In another embodiment, the digital photographic system 300 comprises a plurality of camera modules 330. Such an embodiment may also include at least one strobe unit 336 configured to illuminate a photographic scene, sampled as multiple views by the plurality of camera modules 330. The plurality of camera modules 330 may be configured to sample a wide angle view (e.g., greater than forty-five degrees of sweep among cameras) to generate a panoramic photograph. In one embodiment, a plurality of camera modules 330 may be configured to sample two or more narrow angle views (e.g., less than forty-five degrees of sweep among cameras) to generate a stereoscopic photograph. In other embodiments, a plurality of camera modules 330 may be configured to generate a 3-D image or to otherwise display a depth perspective (e.g. a z-component, etc.) as shown on the display unit 312 or any other display device.

In one embodiment, a display unit 312 may be configured to display a two-dimensional array of pixels to form an image for display. The display unit 312 may comprise a liquid-crystal (LCD) display, a light-emitting diode (LED) display, an organic LED display, or any other technically feasible type of display. In certain embodiments, the display unit 312 may be able to display a narrower dynamic range of image intensity values than a complete range of intensity values sampled from a photographic scene, such as within a single HDR image or over a set of two or more images comprising a multiple exposure or HDR image stack. In one embodiment, images comprising an image stack may be merged according to any technically feasible HDR blending technique to generate a synthetic image for display within dynamic range constraints of the display unit 312. In one embodiment, the limited dynamic range may specify an eight-bit per color channel binary representation of corresponding color intensities. In other embodiments, the limited dynamic range may specify more than eight-bits (e.g., 10 bits, 12 bits, or 14 bits, etc.) per color channel binary representation.

Figure 3B:
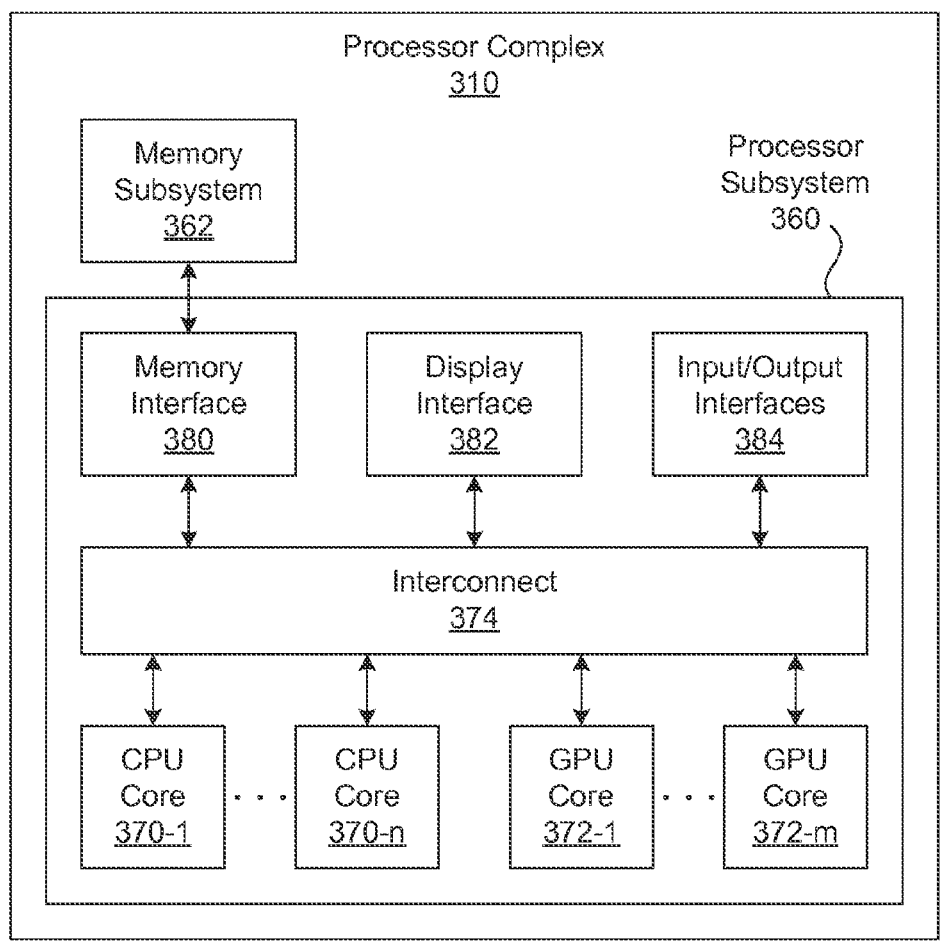
FIG. 3B illustrates a processor complex within the digital photographic system, according to one embodiment.

FIG. 3B illustrates a processor complex 310 within the digital photographic system 300 of FIG. 3A, in accordance with one embodiment. As an option, the processor complex 310 may be implemented in the context of the details of any of the Figures disclosed herein. Of course, however, the processor complex 310 may be implemented in any desired environment. Further, the aforementioned definitions may equally apply to the description below.

As shown, the processor complex 310 includes a processor subsystem 360 and may include a memory subsystem 362. In one embodiment, processor complex 310 may comprise a system on a chip (SoC) device that implements processor subsystem 360, and memory subsystem 362 comprises one or more DRAM devices coupled to the processor subsystem 360. In another embodiment, the processor complex 310 may comprise a multi-chip module (MCM) encapsulating the SoC device and the one or more DRAM devices comprising the memory subsystem 362.

The processor subsystem 360 may include, without limitation, one or more central processing unit (CPU) cores 370, a memory interface 380, input/output interfaces unit 384, and a display interface unit 382, each coupled to an interconnect 374. The one or more CPU cores 370 may be configured to execute instructions residing within the memory subsystem 362, volatile memory 318, NV memory 316, or any combination thereof. Each of the one or more CPU cores 370 may be configured to retrieve and store data through interconnect 374 and the memory interface 380. In one embodiment, each of the one or more CPU cores 370 may include a data cache, and an instruction cache. Additionally, two or more of the CPU cores 370 may share a data cache, an instruction cache, or any combination thereof. In one embodiment, a cache hierarchy is implemented to provide each CPU core 370 with a private cache layer, and a shared cache layer.

In some embodiments, processor subsystem 360 may include one or more graphics processing unit (GPU) cores 372. Each GPU core 372 may comprise a plurality of multi-threaded execution units that may be programmed to implement, without limitation, graphics acceleration functions. In various embodiments, the GPU cores 372 may be configured to execute multiple thread programs according to well-known standards (e.g. OpenGL™, WebGL™, OpenCL™, CUDA™, etc.), and/or any other programmable rendering graphic standard. In certain embodiments, at least one GPU core 372 implements at least a portion of a motion estimation function, such as a well-known Harris detector or a well-known Hessian-Laplace detector. Such a motion estimation function may be used at least in part to align images or portions of images within an image stack. For example, in one embodiment, an HDR image may be compiled based on an image stack, where two or more images are first aligned prior to compiling the HDR image.

As shown, the interconnect 374 is configured to transmit data between and among the memory interface 380, the display interface unit 382, the input/output interfaces unit 384, the CPU cores 370, and the GPU cores 372. In various embodiments, the interconnect 374 may implement one or more buses, one or more rings, a cross-bar, a mesh, or any other technically feasible data transmission structure or technique. The memory interface 380 is configured to couple the memory subsystem 362 to the interconnect 374. The memory interface 380 may also couple NV memory 316, volatile memory 318, or any combination thereof to the interconnect 374. The display interface unit 382 may be configured to couple a display unit 312 to the interconnect 374. The display interface unit 382 may implement certain frame buffer functions (e.g. frame refresh, etc.). Alternatively, in another embodiment, the display unit 312 may implement certain frame buffer functions (e.g. frame refresh, etc.). The input/output interfaces unit 384 may be configured to couple various input/output devices to the interconnect 374.

In certain embodiments, a camera module 330 is configured to store exposure parameters for sampling each image associated with an image stack. For example, in one embodiment, when directed to sample a photographic scene, the camera module 330 may sample a set of images comprising the image stack according to stored exposure parameters. A software module comprising programming instructions executing within a processor complex 310 may generate and store the exposure parameters prior to directing the camera module 330 to sample the image stack. In other embodiments, the camera module 330 may be used to meter an image or an image stack, and the software module comprising programming instructions executing within a processor complex 310 may generate and store metering parameters prior to directing the camera module 330 to capture the image. Of course, the camera module 330 may be used in any manner in combination with the processor complex 310.

In one embodiment, exposure parameters associated with images comprising the image stack may be stored within an exposure parameter data structure that includes exposure parameters for one or more images. In another embodiment, a camera interface unit (not shown in FIG. 3B) within the processor complex 310 may be configured to read exposure parameters from the exposure parameter data structure and to transmit associated exposure parameters to the camera module 330 in preparation of sampling a photographic scene. After the camera module 330 is configured according to the exposure parameters, the camera interface may direct the camera module 330 to sample the photographic scene; the camera module 330 may then generate a corresponding image stack. The exposure parameter data structure may be stored within the camera interface unit, a memory circuit within the processor complex 310, volatile memory 318, NV memory 316, the camera module 330, or within any other technically feasible memory circuit. Further, in another embodiment, a software module executing within processor complex 310 may generate and store the exposure parameter data structure.

Figure 3C:
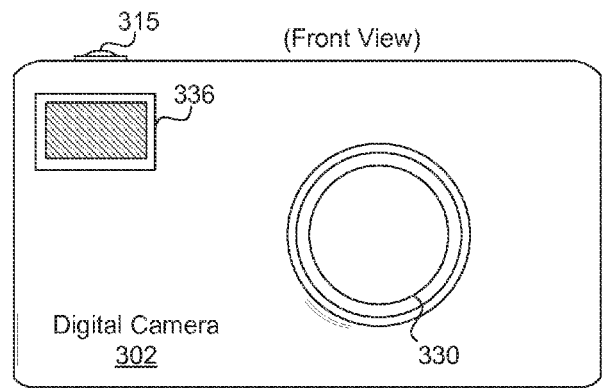
FIG. 3C illustrates a digital camera, in accordance with an embodiment.

FIG. 3C illustrates a digital camera 302, in accordance with one embodiment. As an option, the digital camera 302 may be implemented in the context of the details of any of the Figures disclosed herein. Of course, however, the digital camera 302 may be implemented in any desired environment. Further, the aforementioned definitions may equally apply to the description below.

In one embodiment, the digital camera 302 may be configured to include a digital photographic system, such as digital photographic system 300 of FIG. 3A. As shown, the digital camera 302 includes a camera module 330, which may include optical elements configured to focus optical scene information representing a photographic scene onto an image sensor, which may be configured to convert the optical scene information to an electronic representation of the photographic scene.

Additionally, the digital camera 302 may include a strobe unit 336, and may include a shutter release button 315 for triggering a photographic sample event, whereby digital camera 302 samples one or more images comprising the electronic representation. In other embodiments, any other technically feasible shutter release mechanism may trigger the photographic sample event (e.g. such as a timer trigger or remote control trigger, etc.).

Figure 3D:
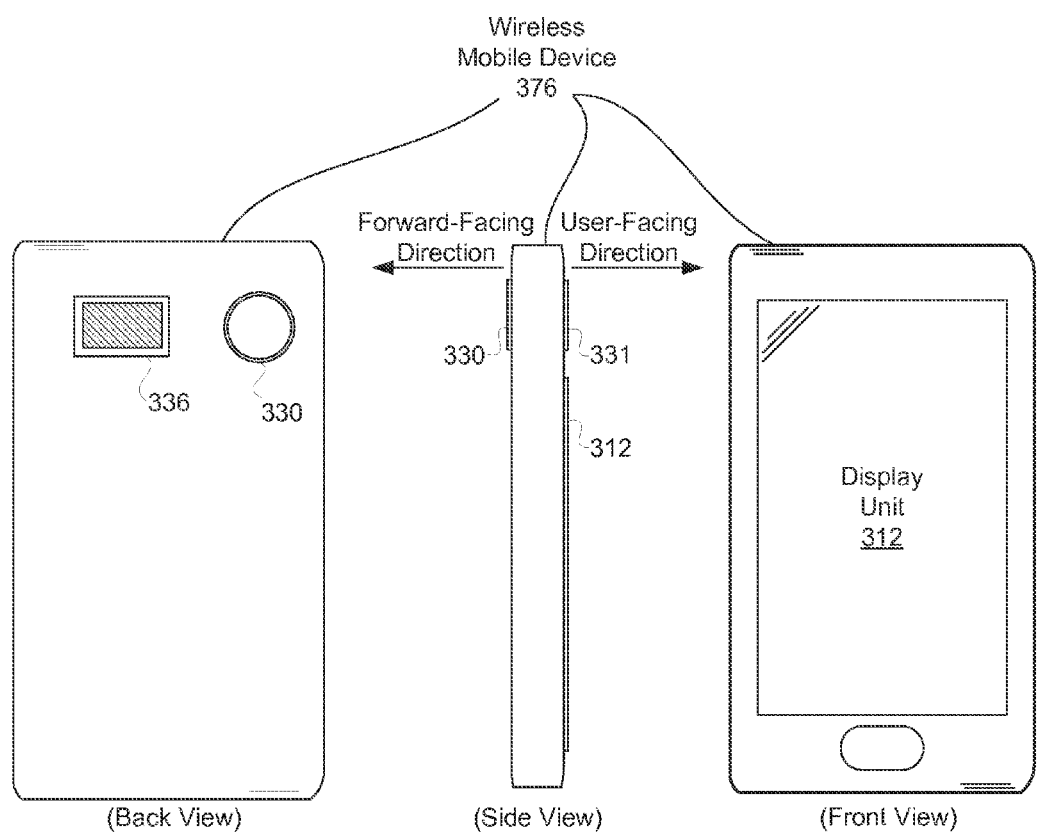
FIG. 3D illustrates a wireless mobile device, in accordance with another embodiment.

FIG. 3D illustrates a wireless mobile device 376, in accordance with one embodiment. As an option, the mobile device 376 may be implemented in the context of the details of any of the Figures disclosed herein. Of course, however, the mobile device 376 may be implemented in any desired environment. Further, the aforementioned definitions may equally apply to the description below.

In one embodiment, the mobile device 376 may be configured to include a digital photographic system (e.g. such as digital photographic system 300 of FIG. 3A), which is configured to sample a photographic scene. In various embodiments, a camera module 330 may include optical elements configured to focus optical scene information representing the photographic scene onto an image sensor, which may be configured to convert the optical scene information to an electronic representation of the photographic scene. Further, a shutter release command may be generated through any technically feasible mechanism, such as a virtual button, which may be activated by a touch gesture on a touch entry display system comprising display unit 312, or a physical button, which may be located on any face or surface of the mobile device 376. Of course, in other embodiments, any number of other buttons, external inputs/outputs, or digital inputs/outputs may be included on the mobile device 376, and which may be used in conjunction with the camera module 330.

As shown, in one embodiment, a touch entry display system comprising display unit 312 is disposed on the opposite side of mobile device 376 from camera module 330. In certain embodiments, the mobile device 376 includes a user-facing camera module 331 and may include a user-facing strobe unit (not shown). Of course, in other embodiments, the mobile device 376 may include any number of user-facing camera modules or rear-facing camera modules, as well as any number of user-facing strobe units or rear-facing strobe units.

In some embodiments, the digital camera 302 and the mobile device 376 may each generate and store a synthetic image based on an image stack sampled by camera module 330. The image stack may include one or more images sampled under ambient lighting conditions, one or more images sampled under strobe illumination from strobe unit 336, or a combination thereof.

Figure 3E:
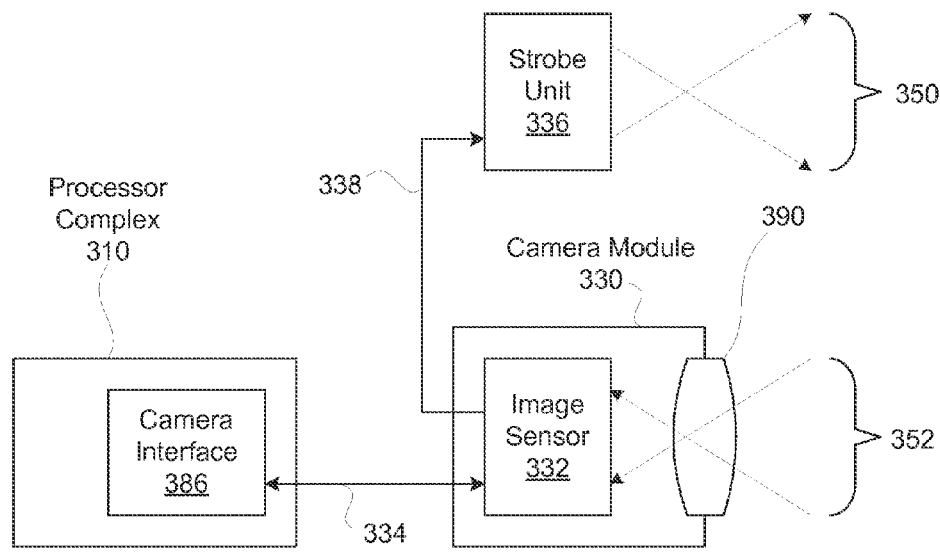
FIG. 3E illustrates a camera module configured to sample an image, according to one embodiment.

FIG. 3E illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to control strobe unit 336 through strobe control signal 338. As shown, a lens 390 is configured to focus optical scene information 352 onto image sensor 332 to be sampled. In one embodiment, image sensor 332 advantageously controls detailed timing of the strobe unit 336 though the strobe control signal 338 to reduce inter-sample time between an image sampled with the strobe unit 336 enabled, and an image sampled with the strobe unit 336 disabled. For example, the image sensor 332 may enable the strobe unit 336 to emit strobe illumination 350 less than one microsecond (or any desired length) after image sensor 332 completes an exposure time associated with sampling an ambient image and prior to sampling a strobe image.

In other embodiments, the strobe illumination 350 may be configured based on a desired one or more target points. For example, in one embodiment, the strobe illumination 350 may light up an object in the foreground, and depending on the length of exposure time, may also light up an object in the background of the image. In one embodiment, once the strobe unit 336 is enabled, the image sensor 332 may then immediately begin exposing a strobe image. The image sensor 332 may thus be able to directly control sampling operations, including enabling and disabling the strobe unit 336 associated with generating an image stack, which may comprise at least one image sampled with the strobe unit 336 disabled, and at least one image sampled with the strobe unit 336 either enabled or disabled. In one embodiment, data comprising the image stack sampled by the image sensor 332 is transmitted via interconnect 334 to a camera interface unit 386 within processor complex 310. In some embodiments, the camera module 330 may include an image sensor controller, which may be configured to generate the strobe control signal 338 in conjunction with controlling operation of the image sensor 332.

Figure 3F:
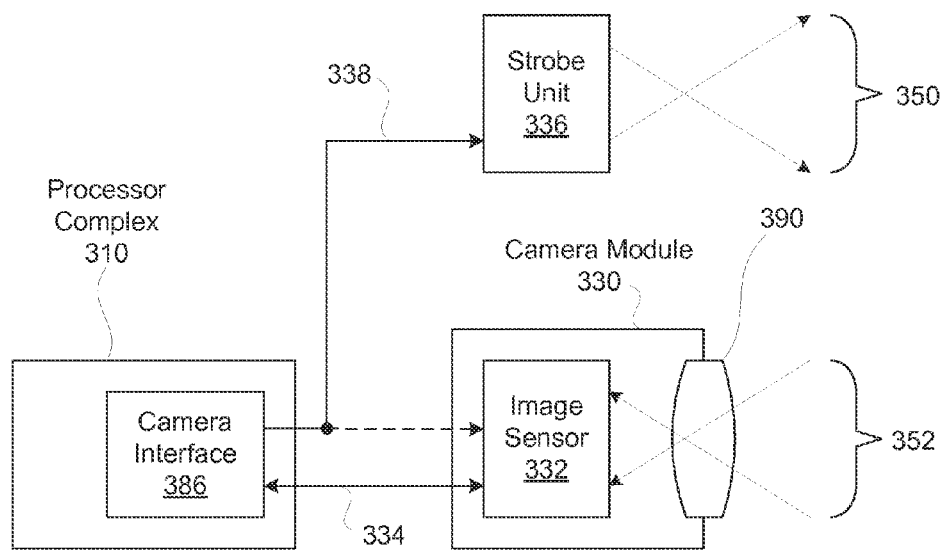
FIG. 3F illustrates a camera module configured to sample an image, according to another embodiment.

FIG. 3F illustrates a camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to sample an image based on state information for strobe unit 336. The state information may include, without limitation, one or more strobe parameters (e.g. strobe intensity, strobe color, strobe time, etc.), for directing the strobe unit 336 to generate a specified intensity and/or color of the strobe illumination 350. In one embodiment, commands for configuring the state information associated with the strobe unit 336 may be transmitted through a strobe control signal 338, which may be monitored by the camera module 330 to detect when the strobe unit 336 is enabled. For example, in one embodiment, the camera module 330 may detect when the strobe unit 336 is enabled or disabled within a microsecond or less of the strobe unit 336 being enabled or disabled by the strobe control signal 338. To sample an image requiring strobe illumination, a camera interface unit 386 may enable the strobe unit 336 by sending an enable command through the strobe control signal 338. In one embodiment, the camera interface unit 386 may be included as an interface of input/output interfaces 384 in a processor subsystem 360 of the processor complex 310 of FIG. 3B The enable command may comprise a signal level transition, a data packet, a register write, or any other technically feasible transmission of a command. The camera module 330 may sense that the strobe unit 336 is enabled and then cause image sensor 332 to sample one or more images requiring strobe illumination while the strobe unit 336 is enabled. In such an implementation, the image sensor 332 may be configured to wait for an enable signal destined for the strobe unit 336 as a trigger signal to begin sampling a new exposure.

In one embodiment, camera interface unit 386 may transmit exposure parameters and commands to camera module 330 through interconnect 334. In certain embodiments, the camera interface unit 386 may be configured to directly control strobe unit 336 by transmitting control commands to the strobe unit 336 through strobe control signal 338. By directly controlling both the camera module 330 and the strobe unit 336, the camera interface unit 386 may cause the camera module 330 and the strobe unit 336 to perform their respective operations in precise time synchronization. In one embodiment, precise time synchronization may be less than five hundred microseconds of event timing error. Additionally, event timing error may be a difference in time from an intended event occurrence to the time of a corresponding actual event occurrence.

In another embodiment, camera interface unit 386 may be configured to accumulate statistics while receiving image data from camera module 330. In particular, the camera interface unit 386 may accumulate exposure statistics for a given image while receiving image data for the image through interconnect 334. Exposure statistics may include, without limitation, one or more of an intensity histogram, a count of over-exposed pixels, a count of under-exposed pixels, an intensity-weighted sum of pixel intensity, or any combination thereof. The camera interface unit 386 may present the exposure statistics as memory-mapped storage locations within a physical or virtual address space defined by a processor, such as one or more of CPU cores 370, within processor complex 310. In one embodiment, exposure statistics reside in storage circuits that are mapped into a memory-mapped register space, which may be accessed through the interconnect 334. In other embodiments, the exposure statistics are transmitted in conjunction with transmitting pixel data for a captured image. For example, the exposure statistics for a given image may be transmitted as in-line data, following transmission of pixel intensity data for the captured image. Exposure statistics may be calculated, stored, or cached within the camera interface unit 386.

In one embodiment, camera interface unit 386 may accumulate color statistics for estimating scene white-balance. Any technically feasible color statistics may be accumulated for estimating white balance, such as a sum of intensities for different color channels comprising red, green, and blue color channels. The sum of color channel intensities may then be used to perform a white-balance color correction on an associated image, according to a white-balance model such as a gray-world white-balance model. In other embodiments, curve-fitting statistics are accumulated for a linear or a quadratic curve fit used for implementing white-balance correction on an image.

In one embodiment, camera interface unit 386 may accumulate spatial color statistics for performing color-matching between or among images, such as between or among an ambient image and one or more images sampled with strobe illumination. As with the exposure statistics, the color statistics may be presented as memory-mapped storage locations within processor complex 310. In one embodiment, the color statistics are mapped in a memory-mapped register space, which may be accessed through interconnect 334, within processor subsystem 360. In other embodiments, the color statistics may be transmitted in conjunction with transmitting pixel data for a captured image. For example, in one embodiment, the color statistics for a given image may be transmitted as in-line data, following transmission of pixel intensity data for the image. Color statistics may be calculated, stored, or cached within the camera interface 386.

In one embodiment, camera module 330 may transmit strobe control signal 338 to strobe unit 336, enabling the strobe unit 336 to generate illumination while the camera module 330 is sampling an image. In another embodiment, camera module 330 may sample an image illuminated by strobe unit 336 upon receiving an indication signal from camera interface unit 386 that the strobe unit 336 is enabled. In yet another embodiment, camera module 330 may sample an image illuminated by strobe unit 336 upon detecting strobe illumination within a photographic scene via a rapid rise in scene illumination. In one embodiment, a rapid rise in scene illumination may include at least a rate of increasing intensity consistent with that of enabling strobe unit 336. In still yet another embodiment, camera module 330 may enable strobe unit 336 to generate strobe illumination while sampling one image, and disable the strobe unit 336 while sampling a different image.

Figure 3G:
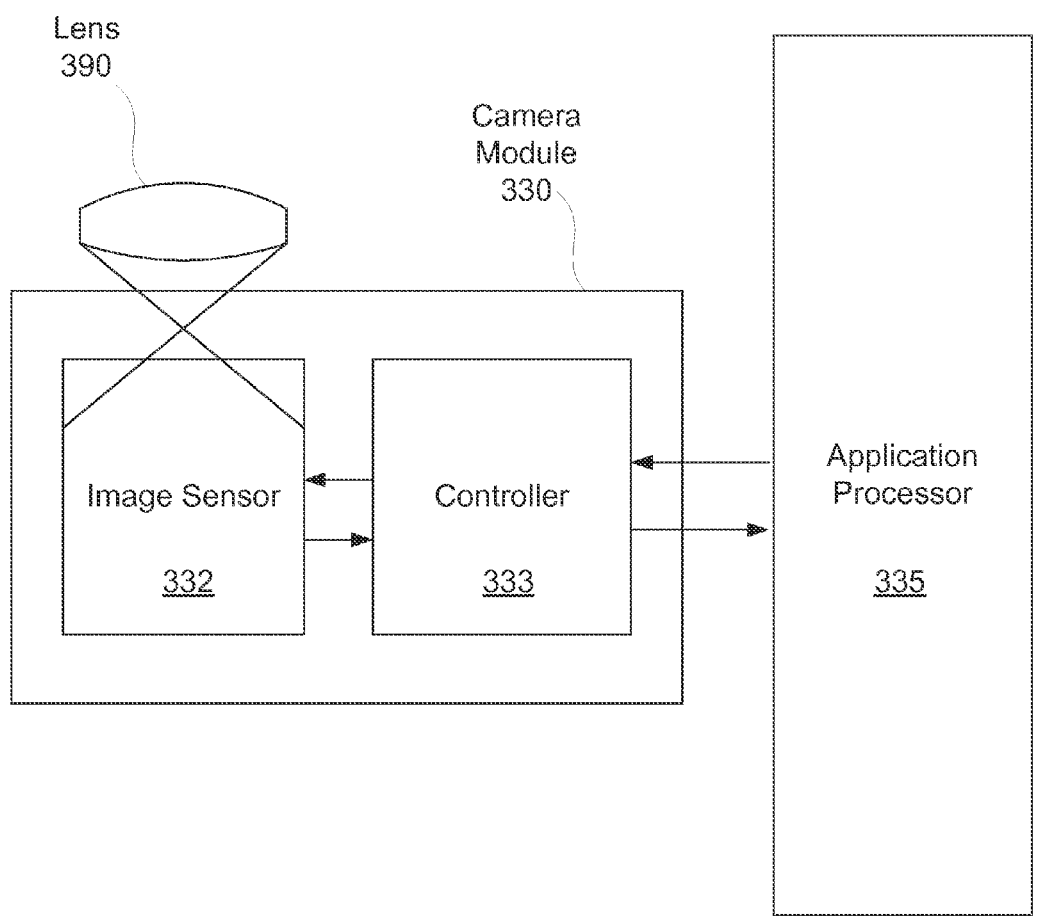
FIG. 3G illustrates a camera module in communication with an application processor, in accordance with an embodiment.

FIG. 3G illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be in communication with an application processor 335. The camera module 330 is shown to include image sensor 332 in communication with a controller 333. Further, the controller 333 is shown to be in communication with the application processor 335.

In one embodiment, the application processor 335 may reside outside of the camera module 330. As shown, the lens 390 may be configured to focus optical scene information onto image sensor 332 to be sampled. The optical scene information sampled by the image sensor 332 may then be communicated from the image sensor 332 to the controller 333 for at least one of subsequent processing and communication to the application processor 335. In another embodiment, the controller 333 may control storage of the optical scene information sampled by the image sensor 332, or storage of processed optical scene information.

In another embodiment, the controller 333 may enable a strobe unit to emit strobe illumination for a short time duration (e.g. less than one microsecond, etc.) after image sensor 332 completes an exposure time associated with sampling an ambient image. Further, the controller 333 may be configured to generate strobe control signal 338 in conjunction with controlling operation of the image sensor 332.

In one embodiment, the image sensor 332 may be a complementary metal oxide semiconductor (CMOS) sensor or a charge-coupled device (CCD) sensor. In another embodiment, the controller 333 and the image sensor 332 may be packaged together as an integrated system or integrated circuit. In yet another embodiment, the controller 333 and the image sensor 332 may comprise discrete packages. In one embodiment, the controller 333 may provide circuitry for receiving optical scene information from the image sensor 332, processing of the optical scene information, timing of various functionalities, and signaling associated with the application processor 335. Further, in another embodiment, the controller 333 may provide circuitry for control of one or more of exposure, shuttering, white balance, and gain adjustment. Processing of the optical scene information by the circuitry of the controller 333 may include one or more of gain application, amplification, and analog-to-digital conversion. After processing the optical scene information, the controller 333 may transmit corresponding digital pixel data, such as to the application processor 335.

In one embodiment, the application processor 335 may be implemented on processor complex 310 and at least one of volatile memory 318 and NV memory 316, or any other memory device and/or system. The application processor 335 may be previously configured for processing of received optical scene information or digital pixel data communicated from the camera module 330 to the application processor 335.

Figure 4:
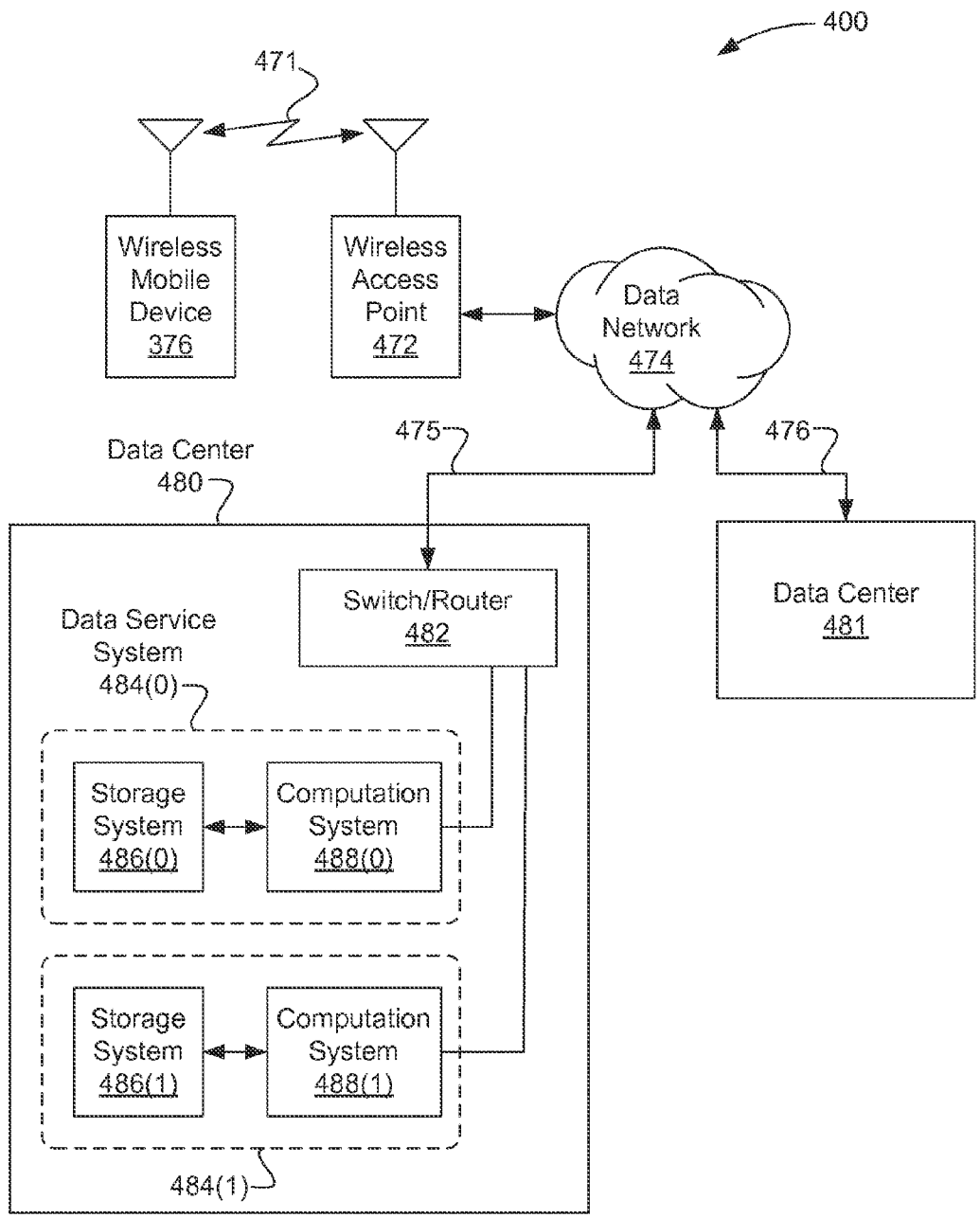
FIG. 4 illustrates a network service system, in accordance with another embodiment.

FIG. 4 illustrates a network service system 400, in accordance with one embodiment. As an option, the network service system 400 may be implemented in the context of the details of any of the Figures disclosed herein. Of course, however, the network service system 400 may be implemented in any desired environment. Further, the aforementioned definitions may equally apply to the description below.

In one embodiment, the network service system 400 may be configured to provide network access to a device implementing a digital photographic system. As shown, network service system 400 includes a wireless mobile device 376, a wireless access point 472, a data network 474, data center 480, and a data center 481. The wireless mobile device 376 may communicate with the wireless access point 472 via a digital radio link 471 to send and receive digital data, including data associated with digital images. The wireless mobile device 376 and the wireless access point 472 may implement any technically feasible transmission techniques for transmitting digital data via digital a radio link 471 without departing the scope and spirit of the present invention. In certain embodiments, one or more of data centers 480, 481 may be implemented using virtual constructs so that each system and subsystem within a given data center 480, 481 may comprise virtual machines configured to perform specified data processing and network tasks. In other implementations, one or more of data centers 480, 481 may be physically distributed over a plurality of physical sites.

The wireless mobile device 376 may comprise a smart phone configured to include a digital camera, a digital camera configured to include wireless network connectivity, a reality augmentation device, a laptop configured to include a digital camera and wireless network connectivity, or any other technically feasible computing device configured to include a digital photographic system and wireless network connectivity.

In various embodiments, the wireless access point 472 may be configured to communicate with wireless mobile device 376 via the digital radio link 471 and to communicate with the data network 474 via any technically feasible transmission media, such as any electrical, optical, or radio transmission media. For example, in one embodiment, wireless access point 472 may communicate with data network 474 through an optical fiber coupled to the wireless access point 472 and to a router system or a switch system within the data network 474. A network link 475, such as a wide area network (WAN) link, may be configured to transmit data between the data network 474 and the data center 480.

In one embodiment, the data network 474 may include routers, switches, long-haul transmission systems, provisioning systems, authorization systems, and any technically feasible combination of communications and operations subsystems configured to convey data between network endpoints, such as between the wireless access point 472 and the data center 480. In one implementation, a wireless the mobile device 376 may comprise one of a plurality of wireless mobile devices configured to communicate with the data center 480 via one or more wireless access points coupled to the data network 474.

Additionally, in various embodiments, the data center 480 may include, without limitation, a switch/router 482 and at least one data service system 484. The switch/router 482 may be configured to forward data traffic between and among a network link 475, and each data service system 484. The switch/router 482 may implement any technically feasible transmission techniques, such as Ethernet media layer transmission, layer 2 switching, layer 3 routing, and the like. The switch/router 482 may comprise one or more individual systems configured to transmit data between the data service systems 484 and the data network 474.

In one embodiment, the switch/router 482 may implement session-level load balancing among a plurality of data service systems 484. Each data service system 484 may include at least one computation system 488 and may also include one or more storage systems 486. Each computation system 488 may comprise one or more processing units, such as a central processing unit, a graphics processing unit, or any combination thereof. A given data service system 484 may be implemented as a physical system comprising one or more physically distinct systems configured to operate together. Alternatively, a given data service system 484 may be implemented as a virtual system comprising one or more virtual systems executing on an arbitrary physical system. In certain scenarios, the data network 474 may be configured to transmit data between the data center 480 and another data center 481, such as through a network link 476.

In another embodiment, the network service system 400 may include any networked mobile devices configured to implement one or more embodiments of the present invention. For example, in some embodiments, a peer-to-peer network, such as an ad-hoc wireless network, may be established between two different wireless mobile devices. In such embodiments, digital image data may be transmitted between the two wireless mobile devices without having to send the digital image data to a data center 480.

Figure 5:
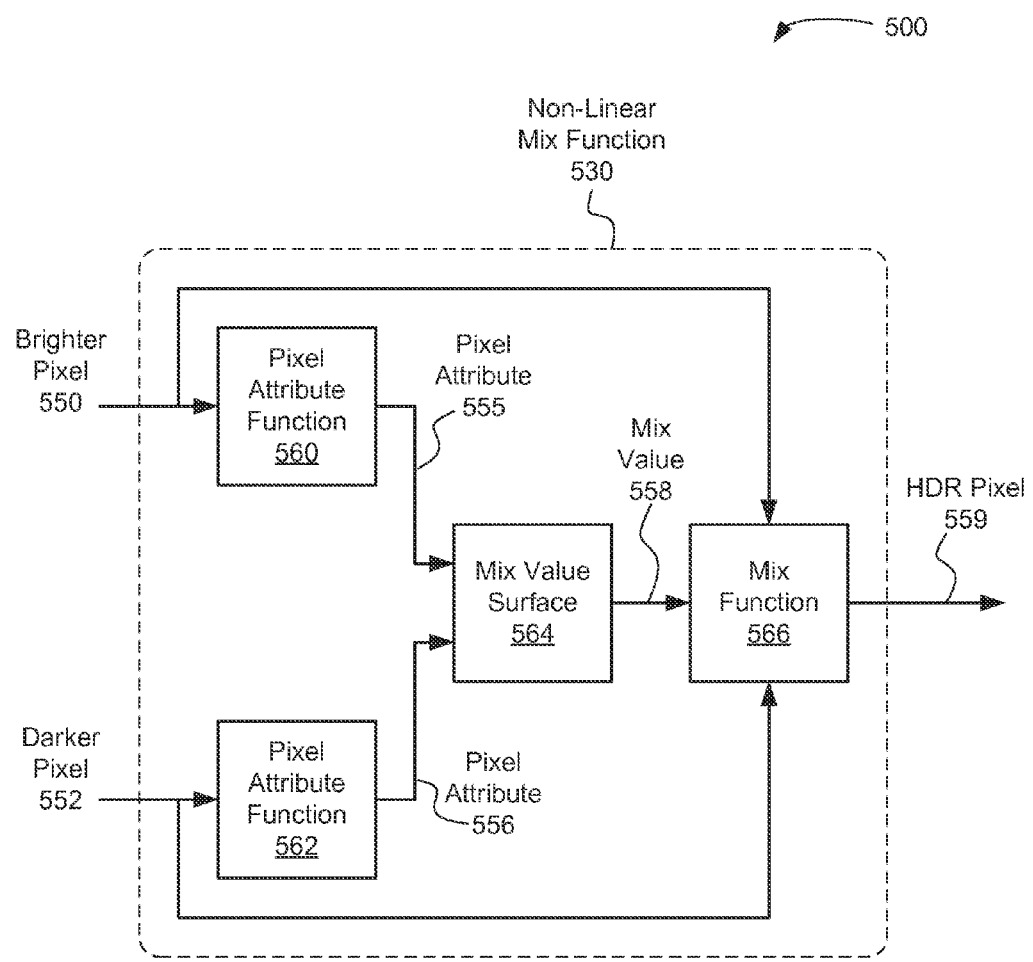
FIG. 5 illustrates a system for outputting a HDR pixel, in accordance with another embodiment.

FIG. 5 shows a system 500 for outputting a HDR pixel, in accordance with one embodiment. As an option, the system 500 may be implemented in the context of the any of the Figures. Of course, however, the system 500 may be carried out in any desired environment. Further, the aforementioned definitions may equally apply to the description below.

As shown, the system 500 includes a non-linear mix function 530. In one embodiment, the non-linear mix function 530 includes receiving a brighter pixel 550 and a darker pixel 552. In one embodiment, the brighter pixel 550 and the darker pixel 552 may be blended via a mix function 566, resulting in a HDR pixel 559.

In one embodiment, the mix function 566 may include any function which is capable of combining two input values (e.g. pixels, etc.). The mix function 566 may define a linear blend operation for generating a vec3 value associated with HDR pixel 559 by blending a vec3 value associated with the brighter pixel 550 and a vec3 value associated with the darker pixel 552 based on mix value 558. For example the mix function 566 may implement the well-known OpenGL mix function. In other examples, the mix function may include normalizing a weighted sum of values for two different pixels, summing and normalizing vectors (e.g. RGB, etc.) associated with the input pixels, computing a weighted average for the two input pixels, and/or applying any other function which may combine in some manner the brighter pixel and the darker pixel. In one embodiment, mix value 558 may range from 0 to 1, and mix function 566 mixes darker pixel 552 and brighter pixel 550 based on the mix value 558. In another embodiment, the mix value 558 ranges from 0 to an arbitrarily large value, however the mix function 566 is configured to respond to mix values greater than 1 as though such values are equal to 1.

In one embodiment, a mix value function may include a product of two polynomials and may include a strength coefficient. In a specific example, the mix value function is implemented as mix value surface 564, which operates to generate mix value 558. One exemplary mix value function is illustrated below in Equation 1:

$$z = p1(x) * p2(y) * s \quad \text{(Eq. 1)}$$

where:
  z is resulting mix value for first and second pixels;
  p1 is a first polynomial in x, where x may be a pixel attribute for first (darker) pixel;
  p2 is a second polynomial in y, where y may be a pixel attribute for second (lighter) pixel; and
  s is a strength coefficient (s==0: no mixing, s==1.0: nominal mixing, s>1.0: exaggerated mixing).

In Equation 1, the strength coefficient (s) may cause the resulting mix value to reflect no mixing (e.g. s=0, etc.), nominal mixing (e.g. s=1, etc.), and exaggerated mixing (e.g. s>1.0, etc.) between the first and second pixels.

In another specific embodiment, a mix function may include a specific polynomial form:

$$z = (1-(1-(1-x)^A)^B) * ((1-(1-y)^C)^D) * s \quad \text{(Eq. 2)}$$

As shown, p1(x) of Equation 1 may be implemented in Equations 2 as the term $(1-(1-(1-x)^A)^B)$, while p2(y) of Equation 2 may be implemented as the term $((1-(1-y)^C)^D)$. In one embodiment, Equation 2 may include the following coefficients: A=8, B=2, C=8, and D=2. Of course, in other embodiments, other coefficient values may be used to optimize overall mixing, which may include subjective visual quality associated with mixing the first and second pixels. In certain embodiments, Equation 2 may be used to generate a mix value for a combination of an "EV0" pixel (e.g. a pixel from an image having an EV0 exposure), an "EV–" pixel (e.g. a pixel from an image having an exposure of EV–1, EV–2, or EV–3, etc.), and an "EV+" pixel (e.g. a pixel from an image having an exposure of EV+1, EV+2, or EV+3, etc.). Further, in another embodiment, Equation 2 may be used to generate mix values for pixels associated with images having a bright exposure, median exposure, and/or dark exposure in any combination.

Figure 10A:
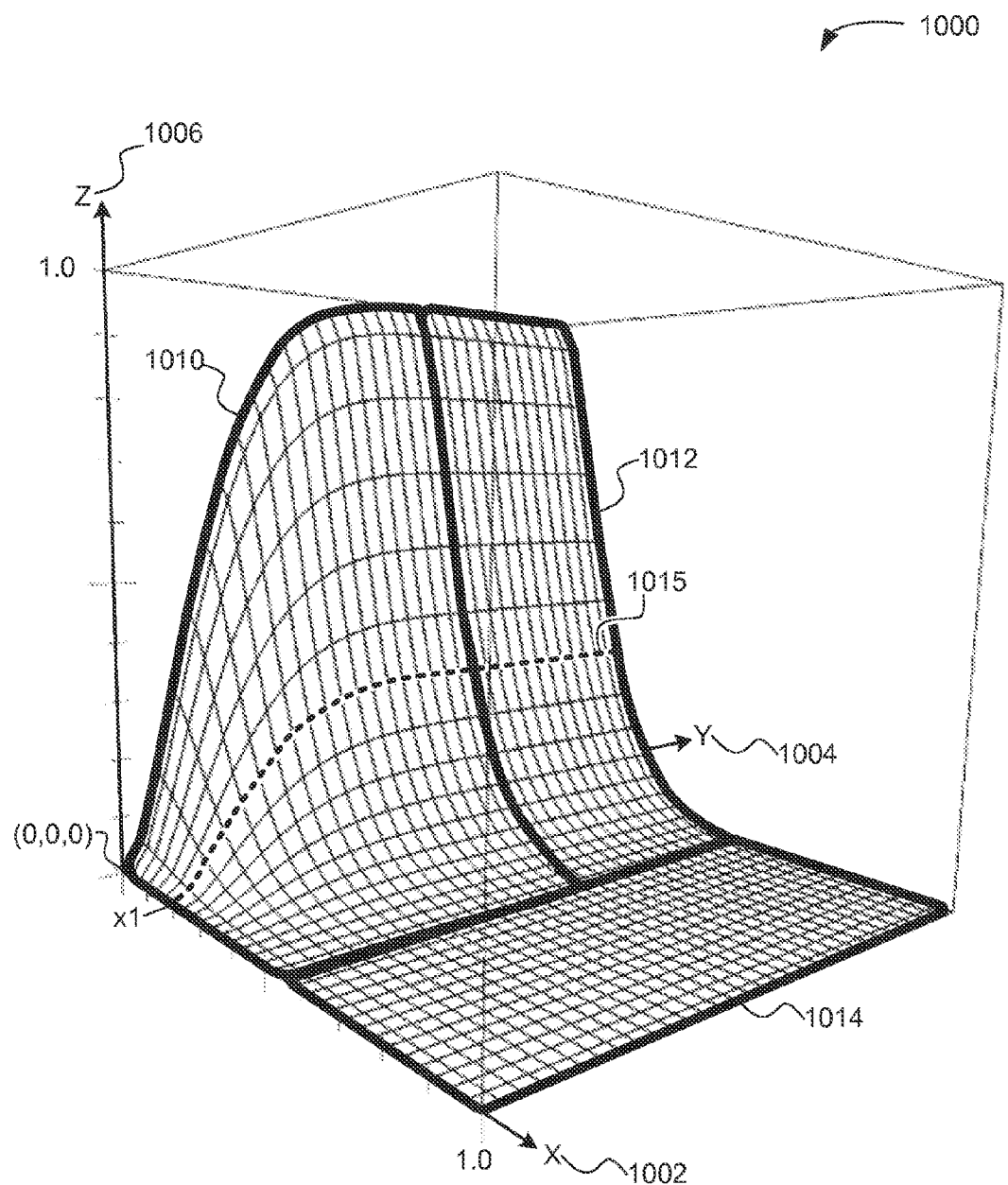
FIG. 10A illustrates a surface diagram, in accordance with another embodiment.
Figure 10B:
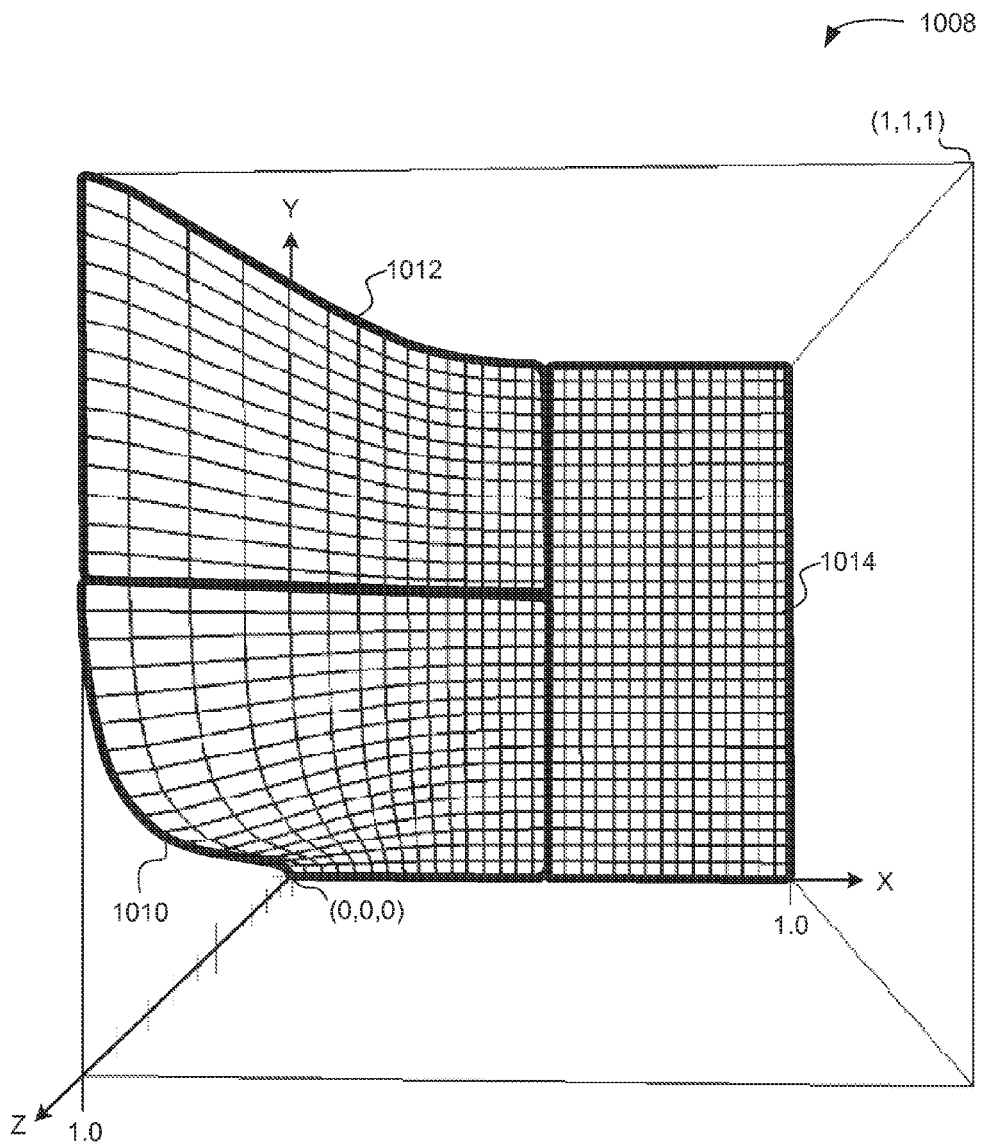
FIG. 10B illustrates a surface diagram, in accordance with another embodiment.

In another embodiment, when z=0, the darker pixel may be given full weight, and when z=1, the brighter pixel may be given full weight. In one embodiment, Equation 2 may correspond with the surface diagrams as shown in FIGS. 10A and 10B.

In another specific embodiment, a mix function may include a specific polynomial form:

$$z = ((1-(1-x)^A)^B) * ((1-(1-y)^C)^D) * s \quad \text{(Eq. 3)}$$

As shown, p1(x) of Equation 1 may be implemented in Equations 3 as the term $((1-(1-x)^A)^B)$, while p2(y) of Equation 3 may be implemented as the term $((1-(1-y)^C)^D)$. In one embodiment, Equation 3 may include the following coefficients: A=8, B=2, C=2, and D=2. Of course, in other embodiments, other coefficient values may be used to optimize the mixing. In another embodiment, Equation 3 may be used to generate a mix value for an "EV0" pixel, and an "EV–" pixel (e.g., EV–1, EV–2, or EV–3) pixel. Further, in another embodiment, Equation 3 may be used to generate mix values for pixels associated with images having a bright exposure, median exposure, and/or dark exposure in any combination.

Figure 11A:
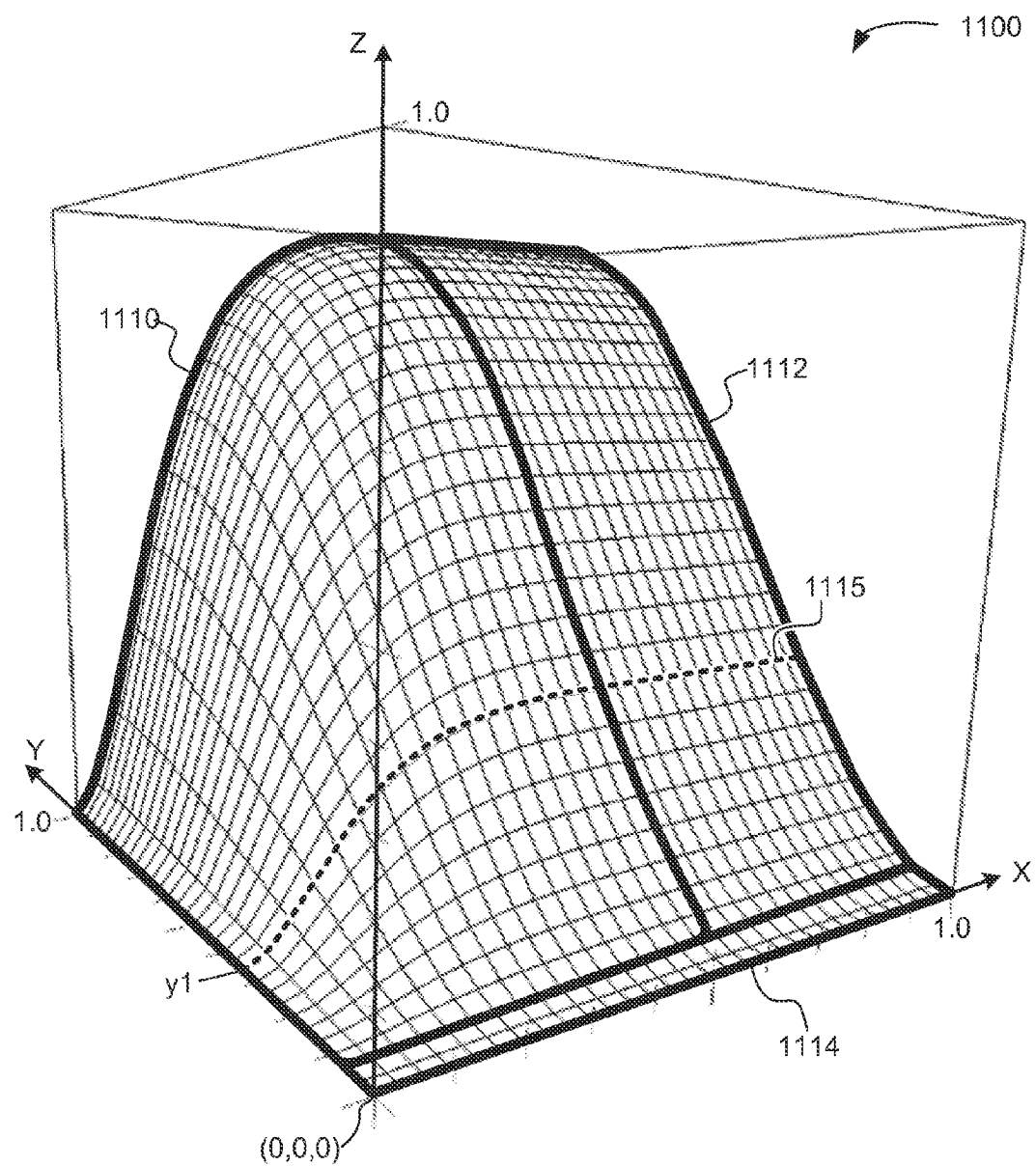
FIG. 11A illustrates a surface diagram, in accordance with another embodiment.
Figure 11B:
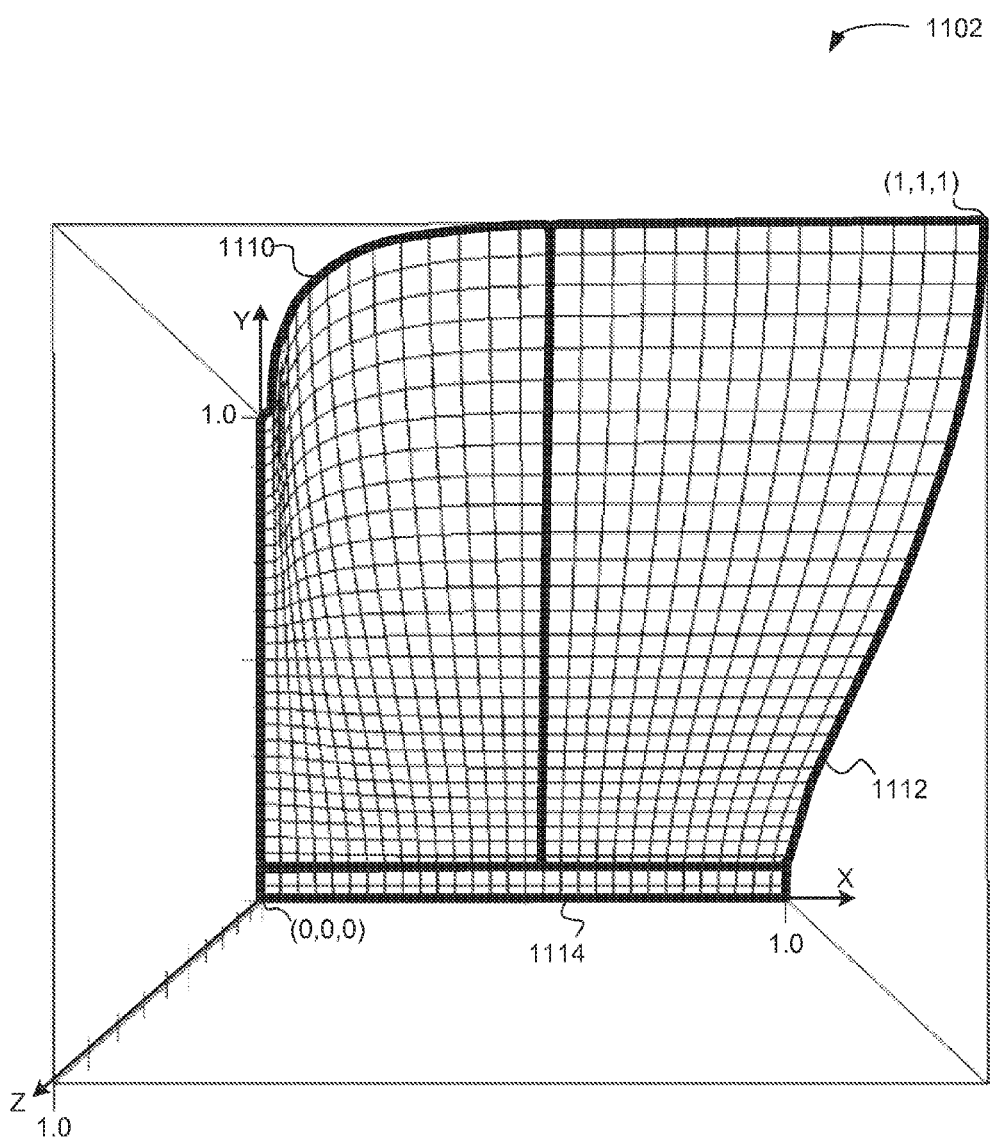
FIG. 11B illustrates a surface diagram, in accordance with another embodiment.

In another embodiment, when z=0, the brighter pixel may be given full weight, and when z=1, the darker pixel may be given full weight. In one embodiment, Equation 3 may correspond with the surface diagrams as shown in FIGS. 11A and 11B.

In another embodiment, the brighter pixel 550 may be received by a pixel attribute function 560, and the darker pixel 552 may be received a pixel attribute function 562. In various embodiments, the pixel attribute function 560 and/or 562 may include any function which is capable of determining an attribute associated with the input pixel (e.g. brighter pixel, darker pixel, etc.). For example, in various embodiments, the pixel attribute function 560 and/or 562 may include determining an intensity, a saturation, a hue, a color space value (e.g. EGB, YCbCr, YUV, etc.), a brightness, an RGB color, a luminance, a chrominance, and/or any other feature which may be associated with a pixel in some manner.

In response to the pixel attribute function 560, a pixel attribute 555 associated with brighter pixel 550 results and is inputted into a mix value function, such as mix value surface 564. Additionally, in response to the pixel attribute function 562, a pixel attribute 556 associated with darker pixel 552 results and is inputted into the mix value function.

In one embodiment, a given mix value function may be associated with a surface diagram. For example, in one embodiment, an x value may be associated with a polynomial associated with the first pixel attribute (or a plurality of pixel attributes), and a y value may be associated with a polynomial associated with the second pixel attribute (or a plurality of pixel attributes). Further, in another embodiment, a strength function may be used to scale the mix value calculated by the mix value function.

In one embodiment, the mix value 558 determined by the mix value function may be selected from a table that embodies the surface diagram. In another embodiment, a first value associated with a first polynomial and a second value associated with a second polynomial may each be used to select a corresponding value from a table, and the two or more values may be used to interpolate a mix value. In other words, at least a portion of the mix value function may be implemented as a table (e.g. lookup table) indexed in x and y to determine a value of z. Each value of z may be directly represented in the table or interpolated from sample points comprising the table.

As shown, a mix value 558 results from the mix value surface 564 and is inputted into the mix function 566, described previously.

HDR Pixel 559 may be generated based on the brighter pixel 550 and the darker pixel 552, in accordance with various embodiments described herein.

Figure 6:
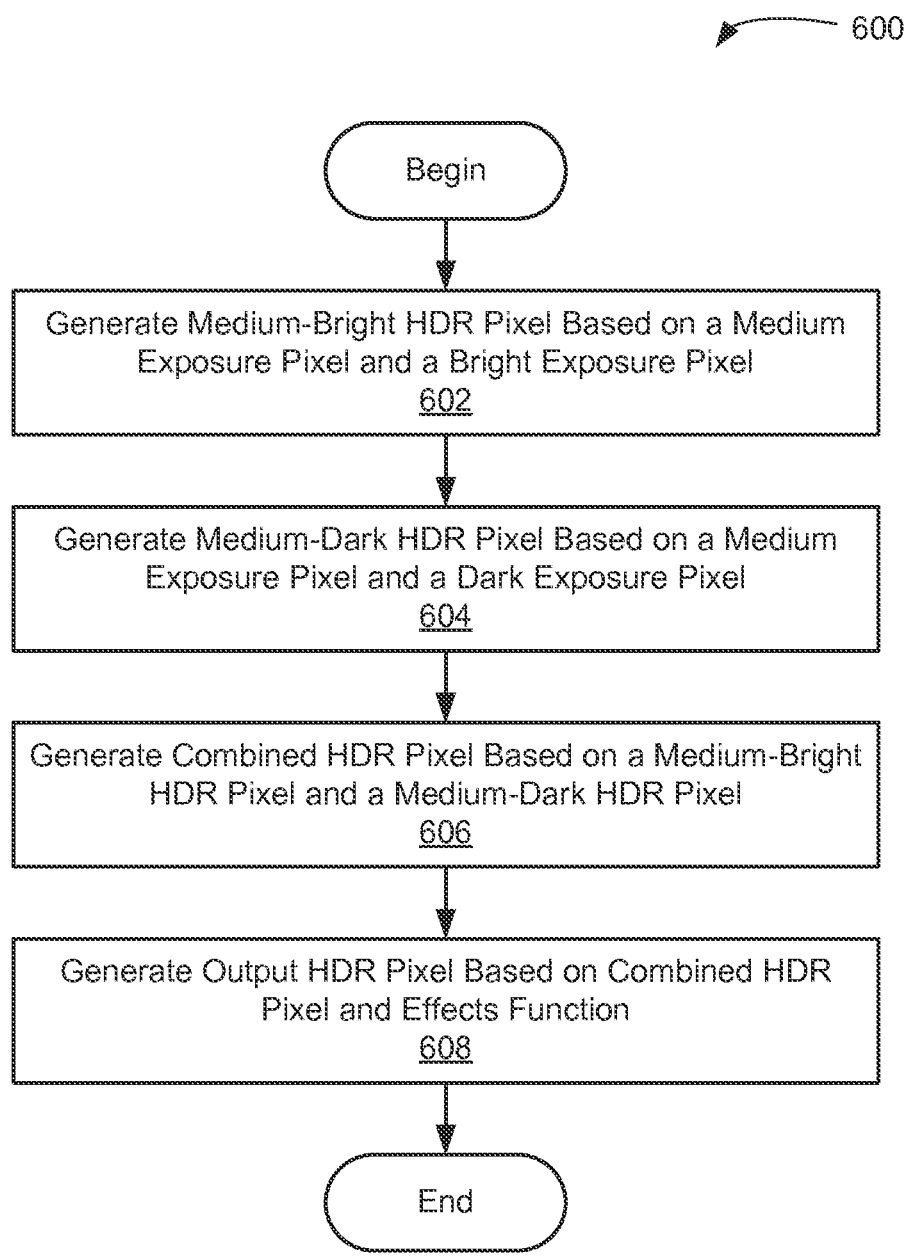
FIG. 6 illustrates a method for generating a HDR pixel based on combined HDR pixel and an effects function, in accordance with another embodiment.

FIG. 6 illustrates a method 600 for generating a HDR pixel based on combined HDR pixel and effects function, in accordance with another embodiment. As an option, the method 600 may be implemented in the context of the details of any of the Figures. Of course, however, the method 600 may be carried out in any desired environment. Further, the aforementioned definitions may equally apply to the description below.

As shown, in one embodiment, a medium-bright HDR pixel may be generated based on a medium exposure pixel and a bright exposure pixel. See operation 602. Additionally, a medium-dark HDR pixel may be generated based on a medium exposure pixel and a dark exposure pixel. See operation 604. For example, in one embodiment, a medium exposure pixel may include an EV0 exposure and a bright exposure pixel may include an EV+1 exposure, and medium-bright HDR pixel may be a blend between the EV0 exposure pixel and the EV+1 exposure pixel. Of course, a bright exposure pixel may include an exposure greater (e.g. in any amount, etc.) than the medium exposure value.

In another embodiment, a medium exposure pixel may include an EV0 exposure and a dark exposure pixel may include an EV−1 exposure, and a medium-dark HDR pixel may be a blend between the EV0 exposure and the EV−1 exposure. Of course, a dark exposure pixel may include an exposure (e.g. in any amount, etc.) less than the medium exposure value.

As shown, a combined HDR pixel may be generated based on a medium-bright HDR pixel and a medium-dark HDR pixel. See operation 606. In another embodiment, the combined HDR pixel may be generated based on multiple medium-bright HDR pixels and multiple medium-dark HDR pixels.

In a separate embodiment, a second combined HDR pixel may be based on the combined HDR pixel and a medium-bright HDR pixel, or may be based on the combined HDR pixel and a medium-dark HDR pixel. In a further embodiment, a third combined HDR pixel may be based on a first combined HDR pixel, a second combined HDR pixel, a medium-bright HDR pixel, a medium-dark HDR pixel, and/or any combination thereof.

Further, as shown, an output HDR pixel may be generated based on a combined HDR pixel and an effects function. See operation 608. For example in one embodiment, an effect function may include a function to alter an intensity, a saturation, a hue, a color space value (e.g. EGB, YCbCr, YUV, etc.), a brightness, an RGB color, a luminance, a chrominance, a contrast, an attribute levels function, and/or an attribute curves function. Further, an effect function may include a filter, such as but not limited to, a pastel look, a watercolor function, a charcoal look, a graphic pen look, an outline of detected edges, a change of grain or of noise, a change of texture, and/or any other modification which may alter the output HDR pixel in some manner.

Figure 7:
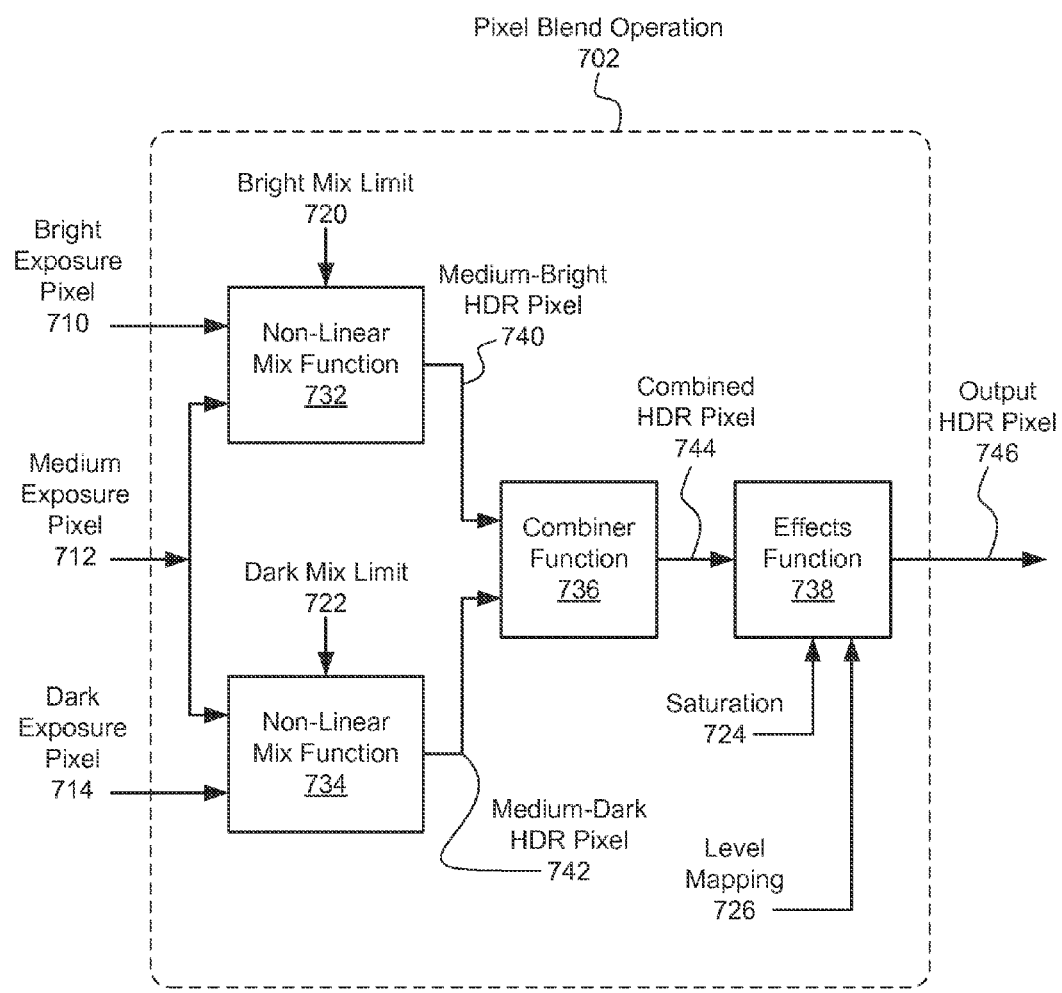
FIG. 7 illustrates a system for outputting a HDR pixel, in accordance with another embodiment.

FIG. 7 illustrates a system 700 for outputting a HDR pixel, in accordance with another embodiment. As an option, the system 700 may be implemented in the context of the details of any of the Figures. Of course, however, the system 700 may be carried out in any desired environment. Further, the aforementioned definitions may equally apply to the description below.

In one embodiment, the system 700 may include a pixel blend operation 702. In one embodiment, the pixel blend operation 702 may include receiving a bright exposure pixel 710 and a medium exposure pixel 712 at a non-linear mix function 732. In another embodiment, the non-linear mix function 732 may operate in a manner consistent with non-linear mix function 530 of FIG. 5. In another embodiment, the pixel blend operation 702 may include receiving a dark exposure pixel 714 and a medium exposure pixel 712 at a non-linear mix function 734. In another embodiment, the non-linear mix function 734 may operate in a manner consistent with item 530 of FIG. 5.

In various embodiments, the non-linear mix function 732 and/or 734 may receive an input from a bright mix limit 720 or dark mix limit 722, respectively. In one embodiment, the bright mix limit 720 and/or the dark mix limit 722 may include an automatic or manual setting. For example, in some embodiments, the mix limit may be set by predefined settings (e.g. optimized settings, etc.). In one embodiment, each mix limit may be predefined to optimize the mix function. In another embodiment, the manual settings may include receiving a user input. For example, in one embodiment, the user input may correspond with a slider setting on a sliding user interface. Each mix limit may correspond to a respective strength coefficient, described above in conjunction with Equations 1-3.

For example, in one embodiment, a mix value function may include a product of two polynomials and may include a strength coefficient. In a specific example, the mix value function is implemented as mix value surface 564, which operates to generate mix value 558.

One exemplary mix value function is illustrated below in Equation 1:

$$z = p1(x) * p2(y) * s \quad \text{(Eq. 1)}$$

where:
z is resulting mix value for first and second pixels;
p1 is a first polynomial in x, where x may be a pixel attribute for first (darker) pixel;
p2 is a second polynomial in y, where y may be a pixel attribute for second (lighter) pixel; and
s is a strength coefficient (s==0: no mixing, s==1.0: nominal mixing, s>1.0: exaggerated mixing).

In Equation 1, the strength coefficient (s) may cause the resulting mix value to reflect no mixing (e.g. s=0, etc.), nominal mixing (e.g. s=1, etc.), and exaggerated mixing (e.g. s>1.0, etc.) between the first and second pixels.

In another specific embodiment, a mix function may include a specific polynomial form:

$$z = (1-(1-(1-x)\hat{\ }A)\hat{\ }B) * ((1-(1-y)\hat{\ }C)\hat{\ }D) * s \quad \text{(Eq. 2)}$$

As shown, p1(x) of Equation 1 may be implemented in Equations 2 as the term $(1-(1-(1-x)\hat{\ }A)\hat{\ }B)$, while p2(y) of Equation 2 may be implemented as the term $((1-(1-y)\hat{\ }C)\hat{\ }D)$. In one embodiment, Equation 2 may include the following coefficients: A=8, B=2, C=8, and D=2. Of course, in other embodiments, other coefficient values may be used to optimize overall mixing, which may include subjective visual quality associated with mixing the first and second pixels. In certain embodiments, Equation 2 may be used to generate a mix value for a combination of an "EV0" pixel (e.g. a pixel from an image having an EV0 exposure), an "EV−" pixel (e.g. a pixel from an image having an exposure of EV−1, EV−2, or EV−3, etc.), and an "EV+" pixel (e.g. a pixel from an image having an exposure of EV+1, EV+2, or EV+3, etc.). Further, in another embodiment, Equation 2 may be used to generate mix values for pixels associated with images having a bright exposure, median exposure, and/or dark exposure in any combination.

In another embodiment, when z=0, the darker pixel may be given full weight, and when z=1, the brighter pixel may be given full weight. In one embodiment, Equation 2 may correspond with the surface diagrams as shown in FIGS. 10A and 10B.

In another specific embodiment, a mix function may include a specific polynomial form:

$$z = ((1-(1-x)\hat{\ }A)\hat{\ }B) * ((1-(1-y)\hat{\ }C)\hat{\ }D) * s \quad \text{(Eq. 3)}$$

As shown, p1(x) of Equation 1 may be implemented in Equations 3 as the term $((1-(1-x)\hat{\ }A)\hat{\ }B)$, while p2(y) of Equation 3 may be implemented as the term $((1-(1-y)\hat{\ }C)\hat{\ }D)$. In one embodiment, Equation 3 may include the following coefficients: A=8, B=2, C=2, and D=2. Of course, in other embodiments, other coefficient values may be used to optimize the mixing. In another embodiment, Equation 3 may be used to generate a mix value for an "EV0" pixel, and an "EV−" pixel (e.g., EV−1, EV−2, or EV−3) pixel. Further, in another embodiment, Equation 3 may be used to generate mix values for pixels associated with images having a bright exposure, median exposure, and/or dark exposure in any combination.

In another embodiment, when z=0, the brighter pixel may be given full weight, and when z=1, the darker pixel may be given full weight. In one embodiment, Equation 3 may correspond with the surface diagrams as shown in FIGS. 11A and 11B.

As shown, in one embodiment, the non-linear mix function 732 results in a medium-bright HDR pixel 740. In another embodiment, the non-linear mix function 734 results in a medium-dark HDR pixel 742. In one embodiment, the medium-bright HDR pixel 740 and the medium-dark HDR pixel 742 are inputted into a combiner function 736. In another embodiment, the combiner function 736 blends the medium-bright HDR pixel 740 and the medium-dark HDR pixel 742.

In various embodiments, the combiner function 736 may include taking an average of two or more pixel values, summing and normalizing a color attribute associated with each pixel value (e.g. a summation of a red/green/blue component in a RGB color space, etc.), determining a RGB (or any color space) vector length which may then be normalized, using an average pixel value in combination with a brighter pixel or a darker pixel, and/or using any other combination to blend the medium-bright HDR pixel 740 and the medium-dark HDR pixel 742.

In one embodiment, the combiner function 736 results in a combined HDR pixel 744. In various embodiments, the combined HDR pixel 744 may include any type of blend associated with the medium-bright pixel 740 and the medium-dark HDR pixel 742. For example, in some embodiments, the combined HDR pixel may include a resulting pixel with no HDR effect applied, whereas in other embodiments, any amount of HDR or even amplification may be applied and be reflected in the resulting combined HDR pixel.

In various embodiments, the combined HDR pixel 744 is inputted into an effects function 738. In one embodiment, the effects function 738 may receive a saturation parameter 724, level mapping parameters 726, and/or any other function parameter which may cause the effects function 738 to modify the combined HDR pixel 744 in some manner. Of course, in other embodiments, the effects function 738 may include a function to alter an intensity, a hue, a color space value (e.g. EGB, YCbCr, YUV, etc.), a brightness, an RGB color, a luminance, a chrominance, a contrast, and/or a curves function. Further, an effect function may include a filter, such as but not limited to, a pastel look, a watercolor function, a charcoal look, a graphic pen look, an outline of detected edges, a change of grain or of noise, a change of texture, and/or any other modification which may alter the combined HDR pixel 744 in some manner. In some embodiments, output HDR pixel 746 may be generated by effects function 738. Alternatively, effects function 738 may be configured to have no effect and output HDR pixel 746 is equivalent to combined HDR pixel 744. In one embodiment, the effects function 738 implements equalization, such as an equalization technique known in the art as contrast limited adaptive histogram equalization (CLAHE).

In some embodiments, and in the alternative, the combined HDR pixel 744 may have no effects applied. After passing through an effects function 738, an output HDR pixel 746 results.

Figure 8:
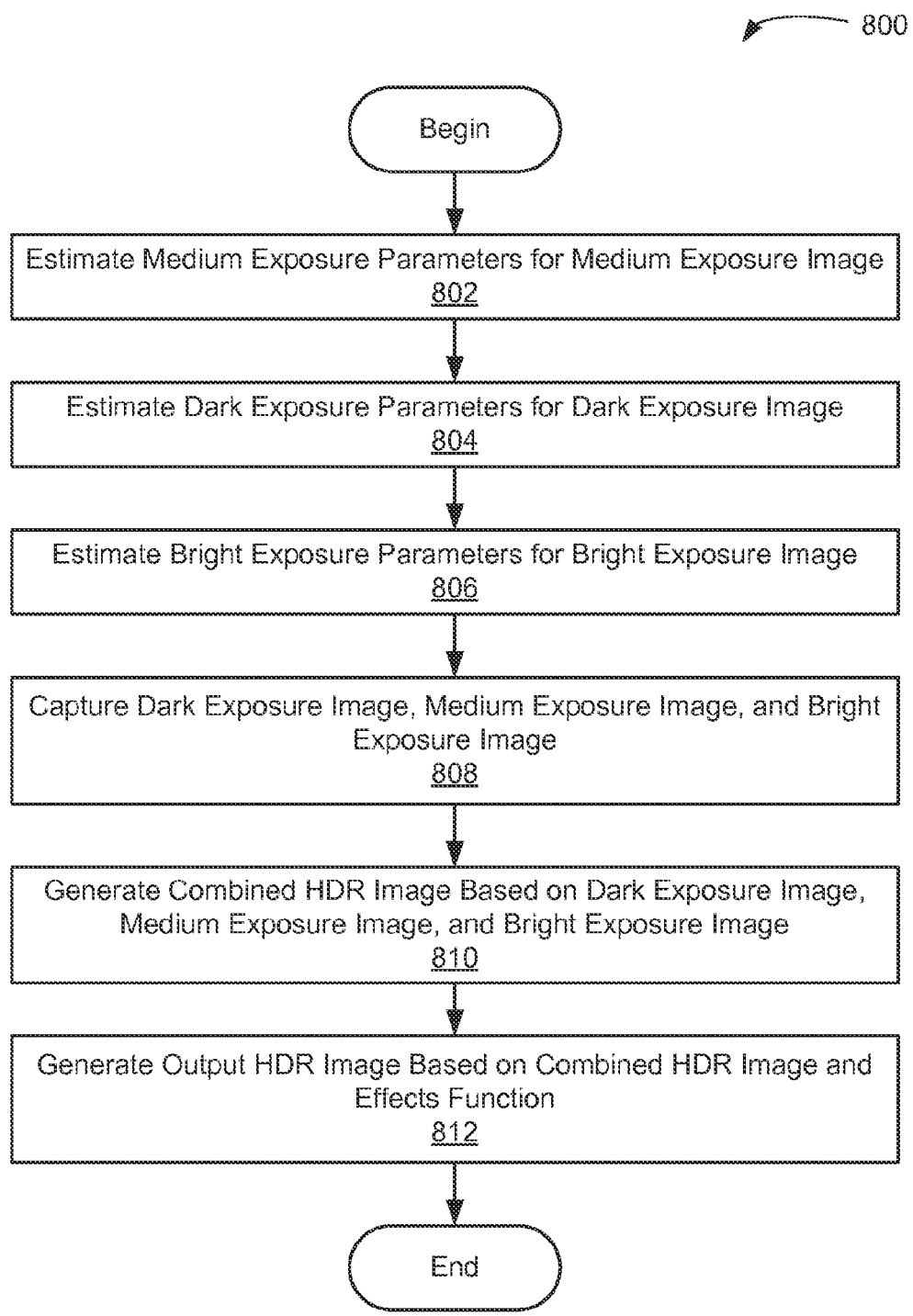
FIG. 8 illustrates a method for generating a HDR pixel based on combined HDR pixel and an effects function, in accordance with another embodiment.

FIG. 8 illustrates a method 800 for generating a HDR pixel based on a combined HDR pixel and an effects function, in accordance with another embodiment. As an option, the method 800 may be implemented in the context of the details of any of the Figures. Of course, however, the method 800 may be carried out in any desired environment. Further, the aforementioned definitions may equally apply to the description below.

In one embodiment, a medium exposure parameter may be estimated for a medium exposure image. See operation 802. Additionally, a dark exposure parameter is estimated for a dark exposure image (see operation 804) and a bright exposure parameter is estimated for a bright exposure image (see operation 806).

In various embodiments, an exposure parameter (e.g. associated with medium exposure, dark exposure, or bright exposure, etc.) may include an ISO, an exposure time, an exposure value, an aperture, and/or any other parameter which may affect image capture time. In one embodiment, the capture time may include the amount of time that the image sensor is exposed to optical information presented by a corresponding camera lens.

In one embodiment, estimating a medium exposure parameter, a dark exposure parameter, and/or a bright exposure parameter may include metering an image associated with a photographic scene. For example, in various embodiments, the brightness of light within a lens' field of view may be determined. Further, the metering of the image may include a spot metering (e.g. narrow area of coverage, etc.), an average metering (e.g. metering across the entire photo, etc.), a multi-pattern metering (e.g. matrix metering, segmented metering, etc.), and/or any other type of metering system. The metering of the image may be performed at any resolution, including a lower resolution than available from the image sensor, which may result in faster metering latency.

As shown, a dark exposure image, a medium exposure image, and a bright exposure image are captured. See operation 808. In various embodiments, capturing an image (e.g. a dark exposure image, a medium exposure image, a bright exposure image, etc.) may include committing the image (e.g. as seen through the corresponding camera lens, etc.) to an image processor and/or otherwise store the image temporarily in some manner. Of course, in other embodiments, the capturing may include a photodiode which may detect light (e.g. RGB light, etc.), a bias voltage or capacitor (e.g. to store intensity of the light, etc.), and/or any other circuitry necessary to receive the light intensity and store it. In other embodiments, the photodiode may charge or discharge a capacitor at a rate that is proportional to the incident light intensity (e.g. associated with the exposure time, etc.).

Additionally, in one embodiment, a combined HDR image may be generated based on a dark exposure image, a medium exposure image, and a bright exposure image. See operation 810. In various embodiments, the combined HDR image may be generated in a manner consistent with combined HDR pixel 744 in FIG. 7. Further, in one embodiment, an output HDR image may be generated based on a combined HDR image comprising combined HDR pixel 744 and an effects function. See operation 812. In various embodiments, the output HDR image may be generated in a manner consistent with Output HDR Pixel 746 in FIG. 7.

Figure 9:
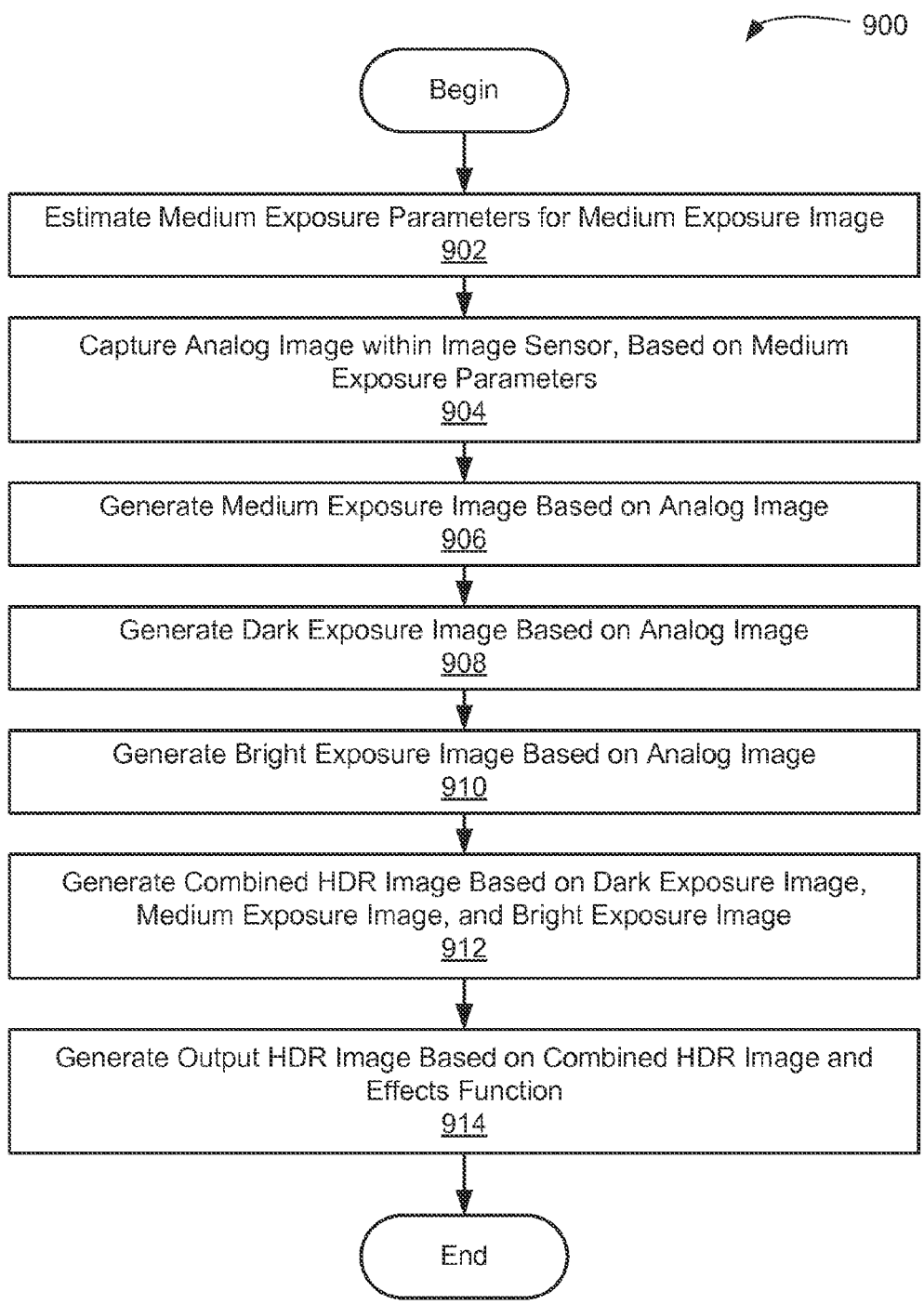
FIG. 9 illustrates a method for generating a HDR pixel based on combined HDR pixel and an effects function, in accordance with another embodiment.

FIG. 9 illustrates a method 900 for generating a HDR pixel based on combined HDR pixel and an effects function, in accordance with another embodiment. As an option, the method 900 may be implemented in the context of the details of any of the Figures. Of course, however, the method 900 may be carried out in any desired environment. Further, the aforementioned definitions may equally apply to the description below.

In one embodiment, a medium exposure parameter may be estimated for medium exposure image. See operation 902. In various embodiments, the medium exposure parameter may include an ISO, an exposure time, an exposure value, an aperture, and/or any other parameter which may affect the capture time. In one embodiment, the capture time may include the amount of time that the image sensor is exposed to optical information presented by a corresponding camera lens. In one embodiment, estimating a medium exposure parameter may include metering the image. For example, in various embodiments, the brightness of light within a lens' field of view may be determined. Further, the metering of the image may include a spot metering (e.g. narrow area of coverage, etc.), an average metering (e.g. metering across the entire photo, etc.), a multi-pattern metering (e.g. matrix metering, segmented metering, etc.), and/or any other type of metering system. The metering of the image may be performed at any resolution, including a lower resolution than available from the image sensor, which may result in faster metering latency. Additionally, in one embodiment, the metering for a medium exposure image may include an image at EV0. Of course, however, in other embodiments, the metering may include an image at any shutter stop and/or exposure value.

As shown, in one embodiment, an analog image may be captured within an image sensor based on medium exposure parameters. See operation 904. In various embodiments, capturing the analog image may include committing the image (e.g. as seen through the corresponding camera lens, etc.) to an image sensor and/or otherwise store the image temporarily in some manner. Of course, in other embodiments, the capturing may include a photodiode which may detect light (e.g. RGB light, etc.), a bias voltage or capacitor (e.g. to store intensity of the light, etc.), and/or any other circuitry necessary to receive the light intensity and store it. In other embodiments, the photodiode may charge or discharge a capacitor at a rate that is proportional to the incident light intensity (e.g. associated with the exposure time, etc.).

Additionally, in one embodiment, a medium exposure image may be generated based on an analog image. See operation 906. Additionally, a dark exposure image may be generated based on an analog image (see operation 908), and a brighter exposure image may be generated based on an analog image (see operation 910). In various embodiments, generating an exposure image (e.g. medium, dark, bright, etc.) may include applying an ISO or film speed to the analog image. Of course, in another embodiment, any function which may alter the analog image's sensitivity to light may be applied. In one embodiment, the same analog image may be sampled repeatedly to generate multiple images (e.g. medium exposure image, dark exposure image, bright exposure image, etc.). For example, in one embodiment, the current stored within the circuitry may be used multiple times.

Additionally, in one embodiment, a combined HDR image may be generated based on a dark exposure image, a medium exposure image, and a bright exposure image. See operation 912. In various embodiments, the combined HDR image may be generated in a manner consistent with Combined HDR Pixel 744 in FIG. 7. Further, in one embodiment, an output HDR image may be generated based on a combined HDR image and an effects function. See operation 914. In various embodiments, the output HDR image may be generated in a manner consistent with Output HDR Pixel 746 in FIG. 7.

FIG. 10A illustrates a surface diagram 1000, in accordance with another embodiment. As an option, the surface diagram 1000 may be implemented in the context of the details of any of the Figures. Of course, however, the surface diagram 1000 may be carried out in any desired environment. Further, the aforementioned definitions may equally apply to the description below.

In one embodiment, surface diagram 1000 depicts a surface associated with Equation 2 for determining a mix value for two pixels, based on two pixel attributes for the two pixels. As shown, the surface diagram 1000 is illustrated within a unit cube having an x axis 1002, a y axis 1004, and a z axis 1006. As described in Equation 2, variable "x" is associated with an attribute for a first (e.g. darker) pixel, and variable "y" is associated with an attribute for a second (e.g. lighter) pixel. For example, each attribute may represent an intensity value ranging from 0 to 1 along a respective x and y axis of the unit cube. An attribute for the first pixel may correspond to pixel attribute 556 of FIG. 5, while an attribute for the second pixel may correspond to pixel attribute 555. As described in Equation 2, variable "z" is associated with the mix value, such as mix value 558, for generating a HDR pixel, such as HDR pixel 559, from the two pixels. A mix value of 0 (e.g. z=0) may result in a HDR pixel that is substantially identical to the first pixel, while a mix value of 1 (e.g. z=1) may result in a HDR pixel that is substantially identical to the second pixel.

As shown, surface diagram 1000 includes a flat region 1014, a transition region 1010, and a saturation region 1012. The transition region 1010 is associated with x values below an x threshold and y values below a y threshold. The transition region 1010 is generally characterized as having monotonically increasing z values for corresponding monotonically increasing x and y values. The flat region 1014 is associated with x values above the x threshold. The flat region 1014 is characterized as having substantially constant z values independent of corresponding x and y values. The saturation region 1012 is associated with x values below the x threshold and above the y threshold. The saturation region 1012 is characterized as having z values that are a function of corresponding x values while being relatively independent of y values. For example, with x=x1, line 1015 shows z monotonically increasing through the transition region 1010, and further shows z remaining substantially constant within the saturation region 1012. In one embodiment mix value surface 564 implements surface diagram 1000. In another embodiment, non-linear mix function 732 of FIG. 7 implements surface diagram 1000. In yet another embodiment, non-linear mix function 734 of FIG. 7 implements surface diagram 1000.

FIG. 10B illustrates a surface diagram 1008, in accordance with another embodiment. As an option, the surface diagram 1008 may be implemented in the context of the details of any of the Figures. Of course, however, the surface diagram 1008 may be implemented in any desired environment. Further, the aforementioned definitions may equally apply to the description below.

In one embodiment, the surface diagram 1008 provides a separate view (e.g. top down view, etc.) of surface diagram 1000 of FIG. 10A. Additionally, the description relating to FIG. 10A may be applied to FIG. 10B as well.

FIG. 11A illustrates a surface diagram 1100, in accordance with another embodiment. As an option, the surface diagram 1100 may be implemented in the context of the details of any of the Figures. Of course, however, the surface diagram 1100 may be implemented in any desired environment. Further, the aforementioned definitions may equally apply to the description below.

In one embodiment, surface diagram 1100 depicts a surface associated with Equation 3 for determining a mix value for two pixels, based on two pixel attributes for the two pixels. As described in Equation 3, variable "x" is associated with an attribute for a first (e.g. darker) pixel, and variable "y" is associated with an attribute for a second (e.g. lighter) pixel. The flat region 1114 may correspond in general character to flat region 1014 of FIG. 10A. Transition region 1110 may correspond in general character to transition region 1010. Saturation region 1112 may correspond in general character to saturation region 1012. While each region of surface diagram 1100 may correspond in general character to similar regions for surface diagram 1000, the size of corresponding regions may vary between surface diagram 1100 and surface diagram 1000. For example, the x threshold associated with surface diagram 1100 is larger than the x threshold associated with surface diagram 1000, leading to a generally smaller flat region 1114. As shown, the surface diagram 1100 may include a flat region 1114, a transition region 1110, and a saturation region 1112.

FIG. 11B illustrates a surface diagram 1102, in accordance with another embodiment. As an option, the surface diagram 1102 may be implemented in the context of the details of any of the Figures. Of course, however, the surface diagram 1102 may be implemented in any desired environment. Further, the aforementioned definitions may equally apply to the description below.

In one embodiment, the surface diagram 1102 provides a separate view (e.g. top down view, etc.) of surface diagram 1100 of FIG. 11A. Additionally, in various embodiments, the description relating to FIG. 11A and FIG. 10A may be applied to FIG. 11B as well.

Figure 12:
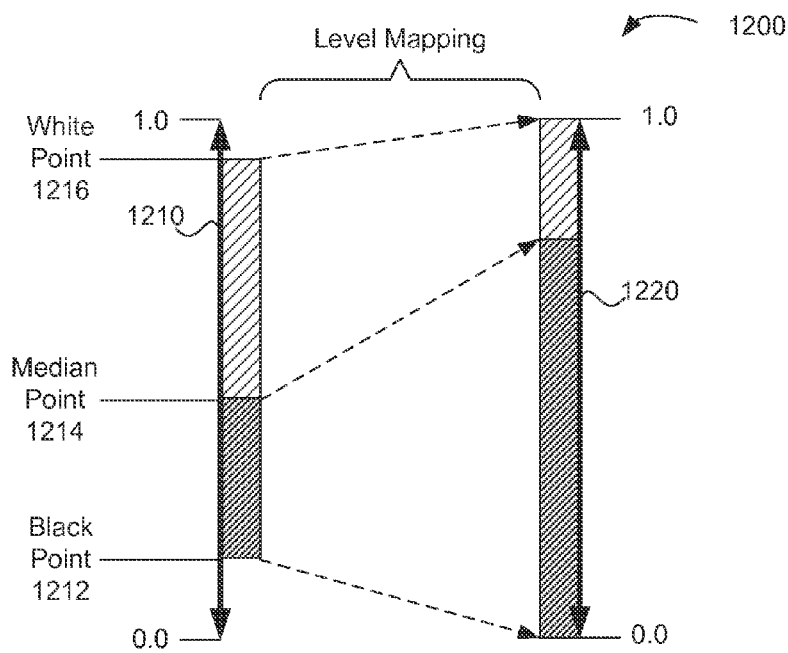
FIG. 12 illustrates a levels mapping diagram, in accordance with another embodiment.

FIG. 12 illustrates a levels mapping function 1200, in accordance with another embodiment. As an option, the levels mapping function 1200 may be implemented in the context of the details of any of the Figures. Of course, however, the levels mapping function 1200 may be carried out in any desired environment. Further, the aforementioned definitions may equally apply to the description below.

In various embodiments, the levels mapping function 1200 maps an input range 1210 to an output range 1220. More specifically, a white point 1216 may be mapped to a new white point in the output range 1220, a median point 1214 may be mapped to a new median point in the output range 1220, and a black point 1212 may be mapped to a new black point in the output range 1220. In one embodiment, the input range 1210 may be associated with an input image and the output range 1220 may be associated with a mapped image. In one embodiment, levels mapping may include an adjustment of intensity levels of an image based on a black point, a white point, a mid point, a median point, or any other arbitrary mapping function.

In certain embodiments, the white point, median point, black point, or any combination thereof, may be mapped based on an automatic detection of corresponding points or manually by a user. For example, in one embodiment, it may be determined that an object in the input image corresponds with a black point (or a white point, or a median point, etc.), such as through object recognition. For example, it may be determined that a logo is present in an image, and accordingly, set a color point (e.g. white, median, black, etc.) based off of an identified object. In other embodiments, the automatic settings may be associated with one or more settings associated with a camera device. For example, in some embodiments, the camera device may correct for a lens deficiency, a processor deficiency, and/or any other deficiency associated with the camera device by applying, at least in part, a set of one or more settings to the levels mapping.

Figure 13:
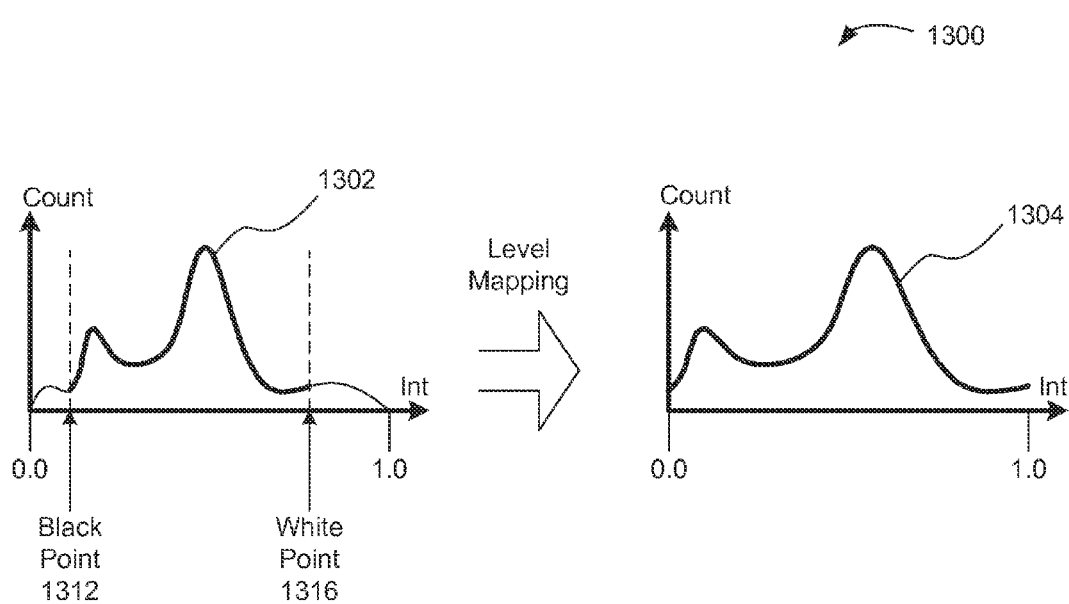
FIG. 13 illustrates a levels mapping diagram, in accordance with another embodiment.

FIG. 13 illustrates a levels mapping function 1300, in accordance with another embodiment. As an option, the levels mapping function 1300 may be implemented in the context of the details of any of the Figures. Of course, however, the levels mapping function 1300 may be carried out in any desired environment. Further, the aforementioned definitions may equally apply to the description below.

In one embodiment, a histogram 1302 may be associated with the input image of FIG. 12. In some embodiments, the histogram 1302 may include statistics for identifying a black point 1312 and a white point 1316. As indicated with respect to FIG. 12, the setting of the color points (e.g. black, white, etc.) may be based on user input (or another manual input, etc.) or on an automatic setting.

Based on the setting of a new black point and a new white point, a new mapped image may be created from the input image. The mapped image may be associated with a new histogram 1304. In one embodiment, after applying the new level mapping to the input image, the new level mapping (e.g. as visualized on the histogram, etc.) may be further modified as desired. For example, in one embodiment, a black point and white point may be automatically selected (e.g. based on optimized settings, etc.). After applying the black point and white point, the user may desire to further refine (or reset) the black point or white point. Of course, in such an embodiment, any color point may be set by the user.

In one embodiment, the white point (or any color point, etc.) may be controlled directly by a user. For example, a slider associated with a white point (or any color point, etc.) may directly control the white point of the pixel or image. In another embodiment, a slider associated with an image may control several settings, including an automatic adjustment to both black and white points (or any color point, etc.) to optimize the resulting pixel or image.

Figure 14:
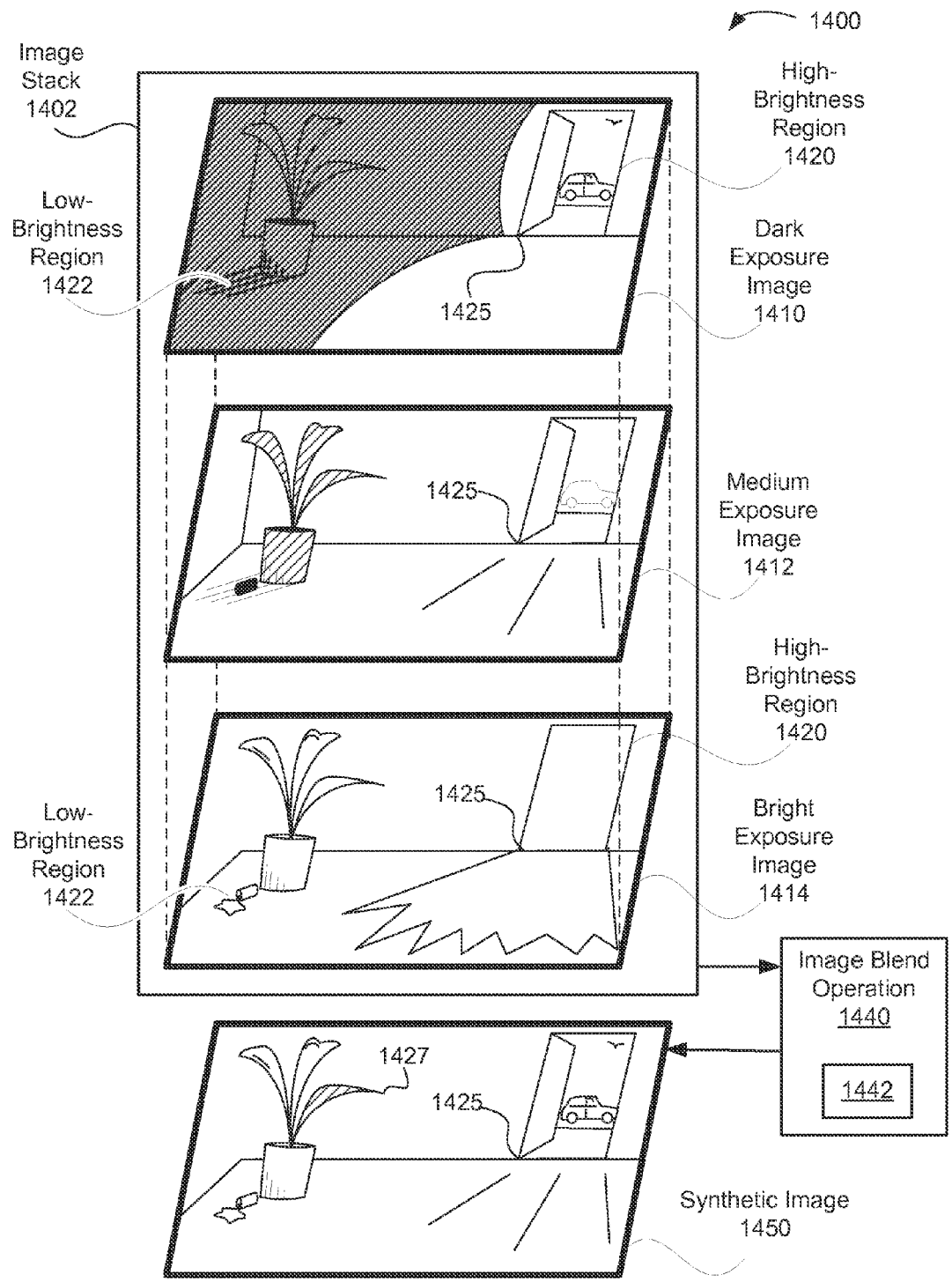
FIG. 14 illustrates an image synthesis operation, in accordance with another embodiment.

FIG. 14 illustrates an image synthesis operation 1400, in accordance with another embodiment. As an option, the image synthesis operation 1400 may be implemented in the context of the details of any of the Figures. Of course, however, the image synthesis operation 1400 may be carried out in any desired environment. Further, the aforementioned definitions may equally apply to the description below.

As shown, an image blend operation 1440 comprising the image synthesis operation 1400 may generate a synthetic image 1450 from an image stack 1402, according to one embodiment of the present invention. Additionally, in various embodiments, the image stack 1402 may include images 1410, 1412, and 1414 of a scene, which may comprise a high brightness region 1420 and a low brightness region 1422. In such an embodiment, medium exposure image 1412 is exposed according to overall scene brightness, thereby generally capturing scene detail.

In another embodiment, medium exposure image 1412 may also potentially capture some detail within high brightness region 1420 and some detail within low brightness region 1422. Additionally, dark exposure image 1410 may be exposed to capture image detail within high brightness region 1420. In one embodiment, in order to capture high brightness detail within the scene, image 1410 may be exposed according to an exposure offset from medium exposure image 1412.

In a separate embodiment, dark exposure image 1410 may be exposed according to local intensity conditions for one or more of the brightest regions in the scene. In such an embodiment, dark exposure image 1410 may be exposed according to high brightness region 1420, to the exclusion of other regions in the scene having lower overall brightness. Similarly, bright exposure image 1414 is exposed to capture image detail within low brightness region 1422. Additionally, in one embodiment, in order to capture low brightness detail within the scene, bright exposure image 1414 may be exposed according to an exposure offset from medium exposure image 1412. Alternatively, bright exposure image 1414 may be exposed according to local intensity conditions for one or more of the darkest regions of the scene.

As shown, in one embodiment, an image blend operation 1440 may generate synthetic image 1450 from image stack 1402. Additionally, in another embodiment, synthetic image 1450 may include overall image detail, as well as image detail from high brightness region 1420 and low brightness region 1422. Further, in another embodiment, image blend operation 1440 may implement any technically feasible operation for blending an image stack. For example, in one embodiment, any high dynamic range (HDR) blending technique may be implemented to perform image blend operation 1440, including but not limited to bilateral filtering, global range compression and blending, local range compression and blending, and/or any other technique which may blend the one or more images. In one embodiment, image blend operation 1440 includes a pixel blend operation 1442. The pixel blend operation 1442 may generate a pixel within synthetic image 1450 based on values for corresponding pixels received from at least two images of images 1410, 1412, and 1414. In one embodiment, pixel blend operation 1442 comprises pixel blend operation 702 of FIG. 7.

In one embodiment, in order to properly perform a blend operation, all of the images (e.g. dark exposure image, medium exposure image, bright exposure image, etc.) may need to be aligned so that visible detail in each image is positioned in the same location in each image. For example, feature 1425 in each image should be located in the same position for the purpose of blending the images 1410, 1412, 1414 to generate synthetic image 1450. In certain embodiments, at least two images of images 1410, 1412, 1414 are generated from a single analog image, as described in conjunction with method 900 of FIG. 9, thereby substantially eliminating any alignment processing needed prior to blending the images 1410, 1412, 1414.

Figure 15:
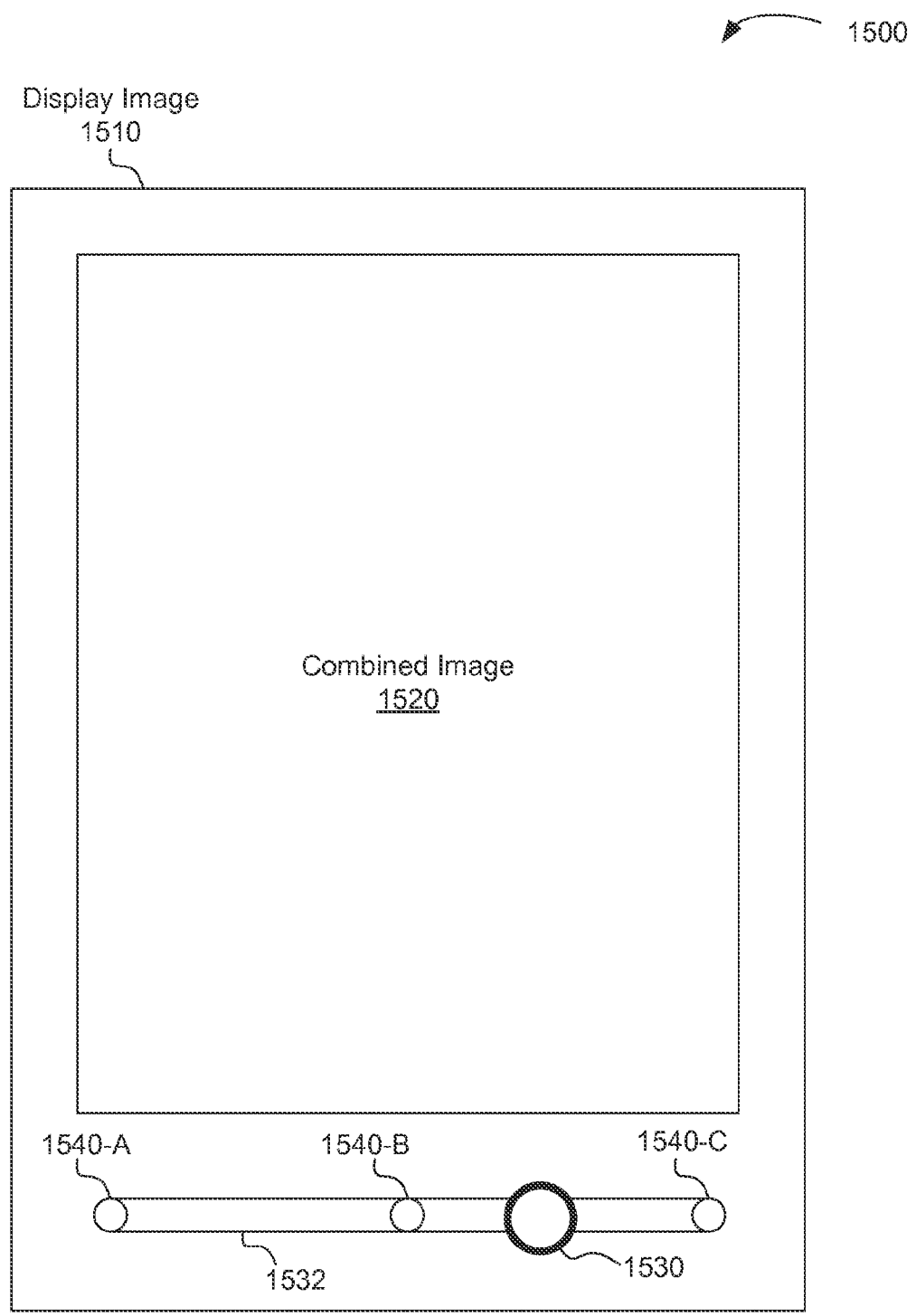
FIG. 15 illustrates a user interface (UI) system for generating a combined image, in accordance with another embodiment.

FIG. 15 illustrates a user interface (UI) system 1500 for generating a combined image 1520, according to one embodiment. As an option, the UI system 1500 may be implemented in the context of the details of any of the Figures disclosed herein. Of course, however, the UI system 1500 may be carried out in any desired environment. Further, the aforementioned definitions may equally apply to the description below.

In one embodiment, a combined image 1520 comprises a combination of at least two related digital images. In one embodiment, the combined image 1520 comprises, without limitation, a combined rendering of a first digital image and a second digital image. In another embodiment, the digital images used to compute the combined image 1520 may be generated by amplifying an analog signal with at least two different gains, where the analog signal includes optical scene information captured based on an optical image focused on an image sensor. In yet another embodiment, the analog signal may be amplified using the at least two different gains on a pixel-by-pixel, line-by-line, or frame-by-frame basis.

In one embodiment, the UI system 1500 presents a display image 1510 that includes, without limitation, a combined image 1520, a slider control 1530 configured to move along track 1532, and two or more indication points 1540, which may each include a visual marker displayed within display image 1510.

In one embodiment, the UI system 1500 is generated by an adjustment tool executing within a processor complex 310 of a digital photographic system 300, and the display image 1510 is displayed on display unit 312. In one embodiment, at least two digital images, such as the at least two related digital images, comprise source images for generating the combined image 1520. The at least two digital images may reside within NV memory 316, volatile memory 318, memory subsystem 362, or any combination thereof. In another embodiment, the UI system 1500 is generated by an adjustment tool executing within a computer system, such as a laptop computer or a desktop computer. The at least two digital images may be transmitted to the computer system or may be generated by an attached camera device. In yet another embodiment, the UI system 1500 may be generated by a cloud-based server computer system, which may download the at least two digital images to a client browser, which may execute combining operations described below. In another embodiment, the UI system 1500 is generated by a cloud-based server computer system, which receives the at least two digital images from a digital photographic system in a mobile device, and which may execute the combining operations described below in conjunction with generating combined image 1520.

The slider control 1530 may be configured to move between two end points corresponding to indication points 1540-A and 1540-C. One or more indication points, such as indication point 1540-B may be positioned between the two end points. Each indication point 1540 may be associated with a specific version of combined image 1520, or a specific combination of the at least two digital images. For example, the indication point 1540-A may be associated with a first digital image generated utilizing a first gain, and the indication point 1540-C may be associated with a second digital image generated utilizing a second gain, where both of the first digital image and the second digital image are generated from a same analog signal of a single captured photographic scene. In one embodiment, when the slider control 1530 is positioned directly over the indication point 1540-A, only the first digital image may be displayed as the combined image 1520 in the display image 1510, and similarly when the slider control 1530 is positioned directly over the indication point 1540-C, only the second digital image may be displayed as the combined image 1520 in the display image 1510.

In one embodiment, indication point 1540-B may be associated with a blending of the first digital image and the second digital image. For example, when the slider control 1530 is positioned at the indication point 1540-B, the combined image 1520 may be a blend of the first digital image and the second digital image. In one embodiment, blending of the first digital image and the second digital image may comprise alpha blending, brightness blending, dynamic range blending, and/or tone mapping or other non-linear blending and mapping operations. In another embodiment, any blending of the first digital image and the second digital image may provide a new image that has a greater dynamic range or other visual characteristics that are different than either of the first image and the second image alone. Thus, a blending of the first digital image and the second digital image may provide a new computed HDR image that may be displayed as combined image 1520 or used to generate combined image 1520. To this end, a first digital signal and a second digital signal may be combined, resulting in at least a portion of a HDR image. Further, one of the first digital signal and the second digital signal may be further combined with at least a portion of another digital image or digital signal. In one embodiment, the other digital image may include another HDR image.

In one embodiment, when the slider control 1530 is positioned at the indication point 1540-A, the first digital image is displayed as the combined image 1520, and when the slider control 1530 is positioned at the indication point 1540-C, the second digital image is displayed as the combined image 1520; furthermore, when slider control 1530 is positioned at indication point 1540-B, a blended image is displayed as the combined image 1520. In such an embodiment, when the slider control 1530 is positioned between the indication point 1540-A and the indication point 1540-C, a mix (e.g. blend) weight may be calculated for the first digital image and the second digital image. For the first digital image, the mix weight may be calculated as having a value of 0.0 when the slider control 1530 is at indication point 1540-C and a value of 1.0 when slider control 1530 is at indication point 1540-A, with a range of mix weight values between 0.0 and 1.0 located between the indication points 1540-C and 1540-A, respectively. Referencing the mix operation instead to the second digital image, the mix weight may be calculated as having a value of 0.0 when the slider control 1530 is at indication point 1540-A and a value of 1.0 when slider control 1530 is at indication point 1540-C, with a range of mix weight values between 0.0 and 1.0 located between the indication points 1540-A and 1540-C, respectively.

A mix operation may be applied to the first digital image and the second digital image based upon at least one mix weight value associated with at least one of the first digital image and the second digital image. In one embodiment, a mix weight of 1.0 gives complete mix weight to the digital image associated with the 1.0 mix weight. In this way, a user may blend between the first digital image and the second digital image. To this end, a first digital signal and a second digital signal may be blended in response to user input. For example, sliding indicia may be displayed, and a first digital signal and a second digital signal may be blended in response to the sliding indicia being manipulated by a user.

This system of mix weights and mix operations provides a UI tool for viewing the first digital image, the second digital image, and a blended image as a gradual progression from the first digital image to the second digital image. In one embodiment, a user may save a combined image 1520 corresponding to an arbitrary position of the slider control 1530. The adjustment tool implementing the UI system 1500 may receive a command to save the combined image 1520 via any technically feasible gesture or technique. For example, the adjustment tool may be configured to save the combined image 1520 when a user gestures within the area occupied by combined image 1520. Alternatively, the adjustment tool may save the combined image 1520 when a user presses, but does not otherwise move the slider control 1530. In another implementation, the adjustment tool may save the combined image 1520 when a user gestures, such as by pressing a UI element (not shown), such as a save button, dedicated to receive a save command.

To this end, a slider control may be used to determine a contribution of two or more digital images to generate a final computed image, such as combined image 1520. Persons skilled in the art will recognize that the above system of mix weights and mix operations may be generalized to include two or more indication points, associated with two or more related images. Such related images may comprise, without limitation, any number of digital images that have been generated using a same analog signal to have different brightness values, which may have zero interframe time.

Furthermore, a different continuous position UI control, such as a rotating knob, may be implemented rather than the slider 1530 to provide mix weight input or color adjustment input from the user.

Figure 16:
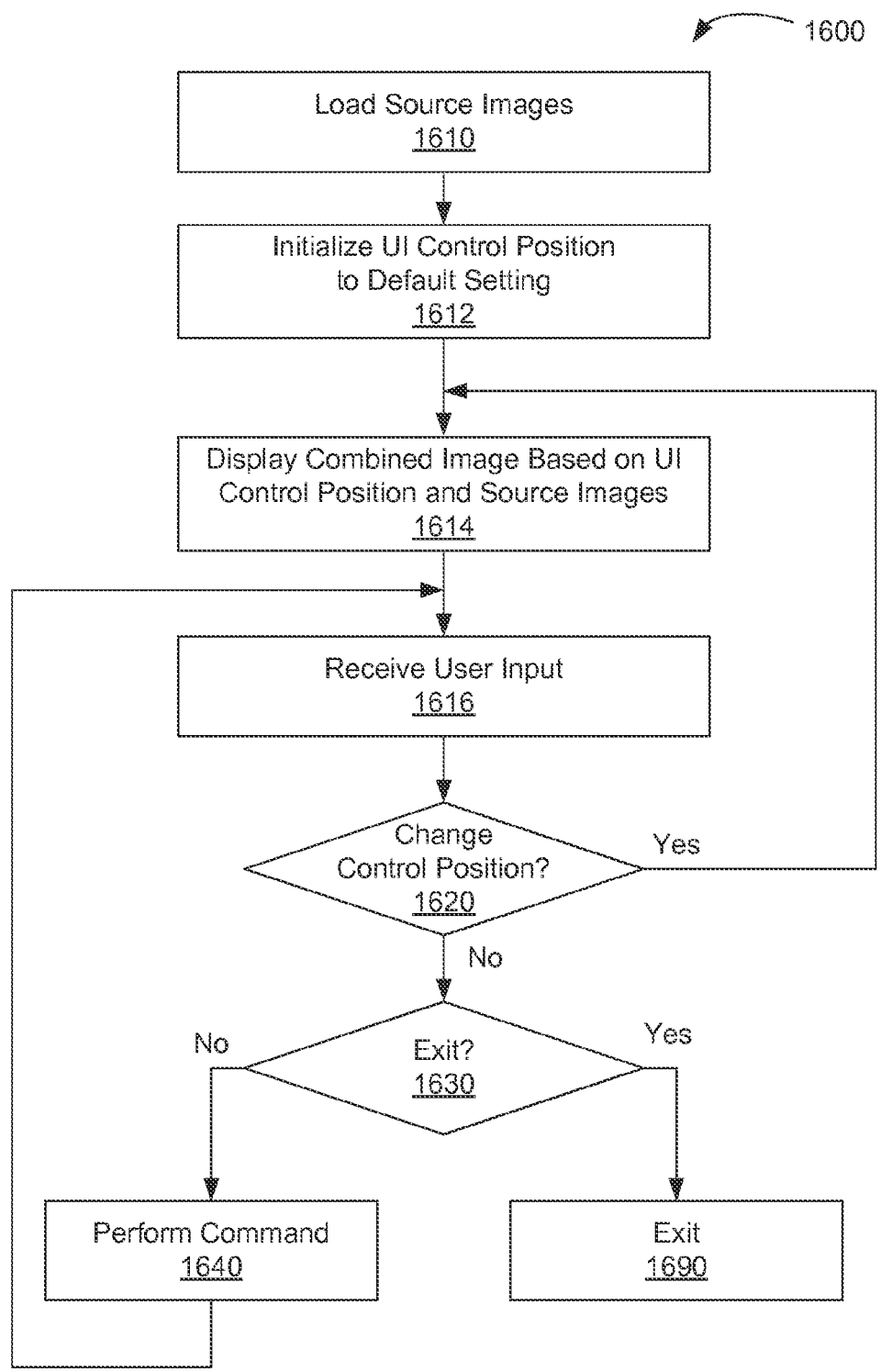
FIG. 16 is a flow diagram of method for generating a combined image, in accordance with another embodiment.

FIG. 16 is a flow diagram of method 1600 for generating a combined image, according to one embodiment. As an option, the method 1600 may be implemented in the context of the details of any of the Figures disclosed herein. Of course, however, the method 1600 may be carried out in any desired environment. Further, the aforementioned definitions may equally apply to the description below.

The method 1600 begins in step 1610, where an adjustment tool executing within a processor complex, such as processor complex 310, loads at least two related source images, such as the first digital image and the second digital image described in the context of FIG. 15. In step 1612, the adjustment tool initializes a position for a UI control, such as slider control 1530 of FIG. 15, to a default setting. In one embodiment, the default setting comprises an end point, such as indication point 1540-A, for a range of values for the UI control. In another embodiment, the default setting comprises a calculated value based on one or more of the at least two related source images. In certain embodiments, the default setting is initialized to a value previously selected by a user in association with an image object comprising at least the first digital image and the second digital image.

In step 1614, the adjustment tool generates and displays a combined image, such as combined image 1520 of FIG. 15, based on a position of the UI control and the at least two related source images. In one embodiment, generating the combined image comprises mixing the at least two related source images as described previously in FIG. 15. In step 1616, the adjustment tool receives user input. The user input may include, without limitation, a UI gesture such as a selection gesture or click gesture within display image 1510. If, in step 1620, the user input should change the position of the UI control, then the adjustment tool changes the position of the UI control and the method proceeds back to step 1614. Otherwise, the method proceeds to step 1630.

If, in step 1630, the user input does not comprise a command to exit, then the method proceeds to step 1640, where the adjustment tool performs a command associated with the user input. In one embodiment, the command comprises a save command and the adjustment tool then saves the combined image, which is generated according to a position of the UI control. The method then proceeds back to step 1616.

Returning to step 1630, if the user input comprises a command to exit, then the method terminates in step 1690, where the adjustment tool exits, thereby terminating execution.

In summary, a technique is disclosed for generating a new digital photograph that beneficially blends a first digital image and a second digital image, where the first digital image and the second digital image are both based on a single analog signal received from an image sensor. The first digital image may be blended with the second digital image based on a function that implements any technically feasible blend technique. An adjustment tool may implement a user interface technique that enables a user to select and save the new digital photograph from a gradation of parameters for combining related images.

One advantage of the disclosed embodiments is that a digital photograph may be selectively generated based on user input using two or more different exposures of a single capture of a photographic scene. Accordingly, the digital photograph generated based on the user input may have a greater dynamic range than any of the individual exposures. Further, the generation of an HDR image using two or more different exposures with zero interframe time allows for the rapid generation of HDR images without motion artifacts.

Figure 17A:
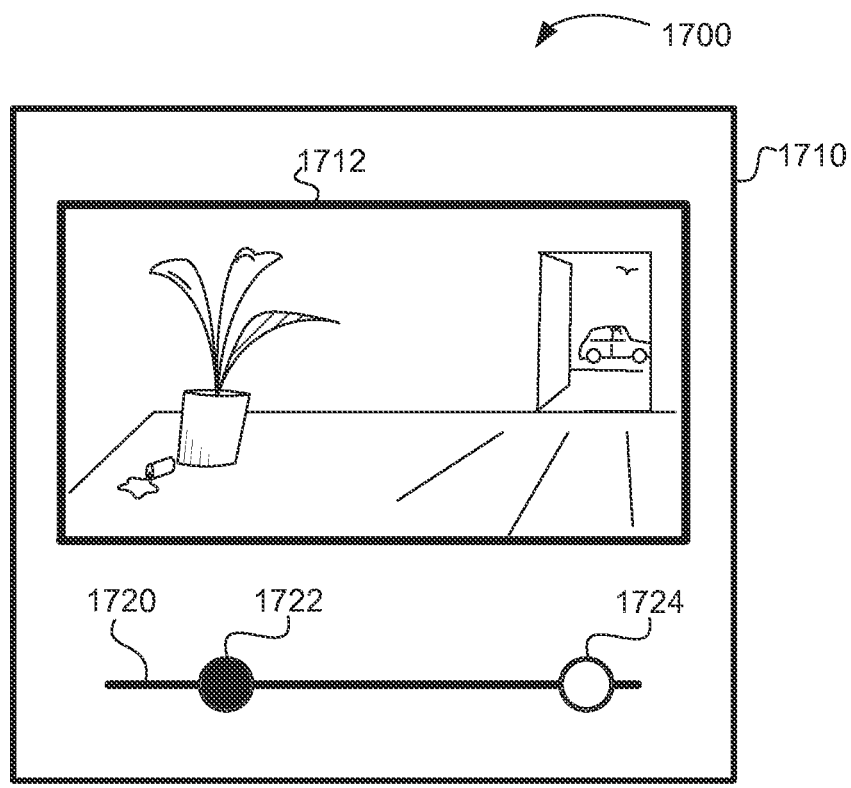
FIG. 17A illustrates a user interface (UI) system for adjusting a white point and a black point, in accordance with another embodiment.

FIG. 17A illustrates a user interface (UI) system 1700 for adjusting a white point and a black point, in accordance with another embodiment. As an option, the UI system 1700 may be implemented in the context of the details of any of the Figures. Of course, however, the UI system 1700 may be carried out in any desired environment. Further, the aforementioned definitions may equally apply to the description below.

As shown, in one embodiment, a slider bar 1720 may include a black point slider 1722 and a white point slider 1724. In various embodiments, the white point slider and the black point slider may be adjusted as desired by the user. Additionally, in another embodiment, the white point slider and the black point may be automatically adjusted. For example, in one embodiment, the black point slider may correspond with a darkest detected point in the image. Additionally, in one embodiment, the white point slider may correspond with the brightest detected point in the image. In one embodiment, the black point slider and the white point slider may each determine a corresponding black point and white point for remapping an input image to generate a resulting image 1712, such as through levels mapping function 1200 of FIG. 12. In other embodiments, the black point slider and the white point slider may bend or reshape a levels mapping curve that maps input range 1210 to output range 1220. As shown, the resulting image 1712, the slider bar 1720, and the sliders 1722, 1724 may be rendered within an application window 1710.

In some embodiments, the white point and the black point may be based on a histogram. For example, in one embodiment, the white point and black point may reflect high and low percentage thresholds associated with the histogram.

In one embodiment, a user may move the white point slider and the black point slider back and forth independently to adjust the black point and white point of the resulting image 1712. In another embodiment, touching the black point slider 1722 may allow the user to drag and drop the black point on a specific point on the image. In like manner, touching the white point slider 1724 may allow the user to drag and drop the white point on a specific point on the image. Of course, in other embodiments, the user may interact with the white point and the black point (or any other point) in any manner such that the user may select and/or adjust the white point and the black point (or any other point).

Figure 17B:
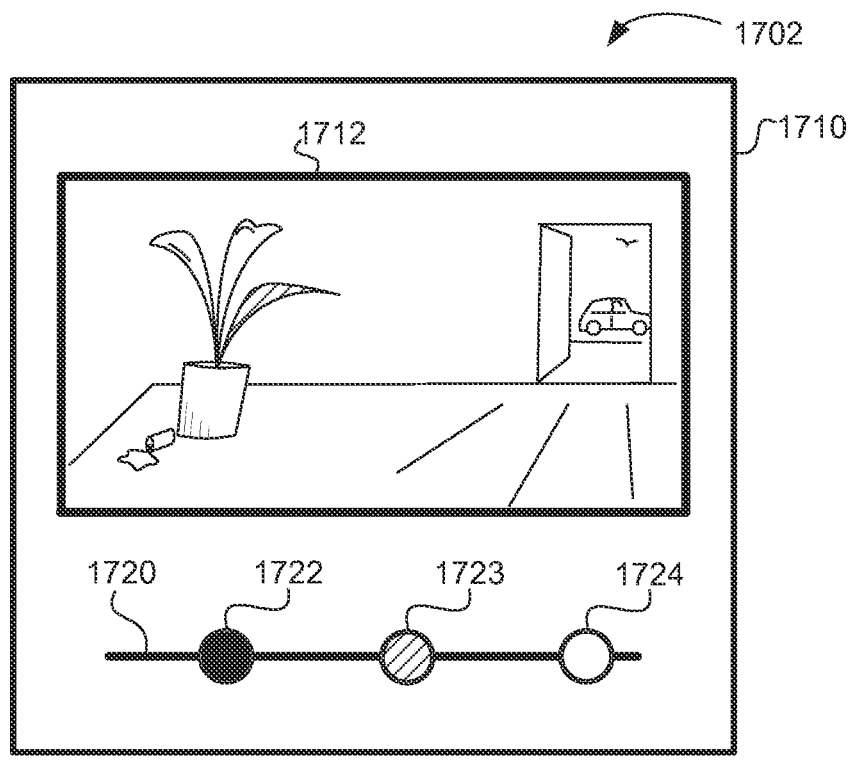
FIG. 17B illustrates a user interface (UI) system for adjusting a white point, median point, and a black point, in accordance with another embodiment.

FIG. 17B illustrates a user interface (UI) system 1702 for adjusting a white point, median point, and a black point, in accordance with another embodiment. As an option, the UI system 1702 may be implemented in the context of the details of any of the Figures. Of course, however, the UI system 1702 may be carried out in any desired environment. Further, the aforementioned definitions may equally apply to the description below.

As shown, in one embodiment, a slider bar 1720 may include a white point slider 1722, a median point slider 1723, and a white point slider 1724. In one embodiment, UI system 1702 is configured to operate substantially identically to UI system 1700, with the addition of median point slider 1723 and corresponding median point levels adjustment within an associated levels adjustment function. The median point may be adjusted manually by the user by moving the median point slider 1723 or automatically based on, for example, information within an input image.

Still yet, in various embodiments, one or more of the techniques disclosed herein may be applied to a variety of markets and/or products. For example, although the techniques have been disclosed in reference to a still photo capture, they may be applied to televisions, video capture, web conferencing (or live streaming capabilities, etc.), security cameras (e.g. increase contrast to determine characteristic, etc.), automobiles (e.g. driver assist systems, in-car infotainment systems, etc.), and/or any other product which includes a camera input.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
   circuitry for:
   receiving a first pixel attribute of a first pixel from a first image, wherein the first pixel is located at a pixel position within the first image;
   receiving a second pixel attribute of a second pixel from a second image, wherein the second pixel is located at the pixel position within the second image, and wherein the first image and the second image are aligned, and wherein the first pixel is brighter than the second pixel;
   identifying a scalar based on a mix value surface that receives as inputs the first pixel attribute and the second pixel attribute, wherein the x-axis of the mix value surface corresponds to the second pixel attribute, and the y-axis of the mix value surface corresponds to the first pixel attribute, wherein the mix value surface includes a flat region, a transition region, and a saturation region corresponding to thresholds and four arbitrary constants associated with the inputs; wherein
   the scalar is evaluated from a polynomial and the four arbitrary constants dictate the powers of the polynomial;
   generating a mix value based on the scalar;
   blending, based on the mix value, the first pixel and the second pixel, to create a first blended pixel; and
   outputting the first blended pixel.

2. The apparatus of claim 1, wherein the apparatus is operable such that the first pixel attribute and the second pixel attribute each include an intensity that corresponds to a first value of a numeric range for the first pixel, and a second value of the numeric range for the second pixel.

3. The apparatus of claim 1, wherein the apparatus is operable such that the first pixel attribute and the second pixel attribute each include at least one of an intensity, a saturation, a hue, a color space value, a brightness, a RGB color, a luminance, and a chrominance.

4. The apparatus of claim 1, wherein the apparatus is operable such that the scalar is identified by at least one of generating, selecting, and interpolating.

5. The apparatus of claim 1, wherein the apparatus is operable such that the scalar is identified utilizing a plurality of polynomials.

6. The apparatus of claim 5, wherein the apparatus is operable such that a first polynomial of the plurality of polynomials is a function of the first pixel attribute and a second polynomial of the plurality of polynomials is a function of the second pixel attribute, and wherein the first polynomial is at least one of a higher order, an equal order, and a lower order relative to the second polynomial.

7. The apparatus of claim 1, wherein the apparatus is operable such that the mix value is at least one of the product of at least two polynomials and at least one strength coefficient, and a result of a lookup table implementing the mix value surface.

8. The apparatus of claim 1, wherein the apparatus is operable such that the scalar is identified based on either a polynomial of the form $z=(1-(1-(1-x)^A)^B)*((1-(1-y)^C)^D)$ or a polynomial of the form z((1−(1−x)^A)^B)*((1−(1−y)^C)^D), where z corresponds to the scalar, x corresponds to the second pixel attribute, y corresponds to the first pixel attribute, and A, B, C, D correspond to arbitrary constants.

9. The apparatus of claim 1, wherein the apparatus is operable such that the first blended pixel is a high dynamic range (HDR) pixel based on the blending of the first pixel and the second pixel.

10. The apparatus of claim 1, the circuitry further for:
receiving a third pixel attribute of a third pixel, from a third image, wherein the third pixel is located at the pixel position within the third image, and wherein the first image, the second image, and the third image are aligned;
identifying a second scalar based on the second pixel attribute and the third pixel attribute;
blending, based on the second scalar, the second pixel and the third pixel; and
generating a second blended pixel based on the blending of the second pixel and the third pixel.

11. The apparatus of claim 10, wherein the first pixel attribute includes a first value, the third pixel attribute includes a third value, and the second pixel attribute includes a second value between the first value and the third value.

12. The apparatus of claim 11, wherein the apparatus is operable such that the first blended pixel and the second blended pixel are combined resulting in a combined pixel.

13. The apparatus of claim 12, wherein the apparatus is operable such that the combined pixel is processed based on at least one of saturation input and levels mapping input.

14. The apparatus of claim 1, wherein the apparatus is operable such that level mapping is performed on at least one pixel subject to the blending, in response to user input.

15. The apparatus of claim 14, wherein the apparatus is operable such that first indicia corresponding to at least one brighter point and second indicia corresponding to at least one brighter point are displayed, and the user input is further capable of including manipulation of at least one of the first indicia and the second indicia.

16. The apparatus of claim 15, wherein the apparatus is operable such that third indicia corresponding to at least one medium point is displayed, and the user input is further capable of including manipulation of the third indicia.

17. The apparatus of claim 1, wherein the apparatus is operable such that a dark exposure parameter and a bright exposure parameter are estimated, wherein the bright exposure parameter is used for receiving the first pixel attribute of the first pixel, and the dark exposure parameter is used for receiving the second pixel attribute of the second pixel; and the dark exposure parameter and the bright exposure parameter further being associated with an exposure time.

18. The apparatus of claim 12, wherein the combined pixel is remapped according to contrast limited adaptive histogram equalization.

19. A computer program product embodied on a non-transitory-computer readable medium, comprising:
code for receiving a first pixel attribute of a first pixel from a first image, wherein the first pixel is located at a pixel position within the first image;
code for receiving a second pixel attribute of a second pixel from a second image, wherein the second pixel is located at the pixel position within the second image, and wherein the first image and the second image are aligned, and wherein the first pixel is brighter than the second pixel;
code for identifying a scalar based on a mix value surface that receives as inputs the first pixel attribute and the second pixel attribute, wherein the x-axis of the mix value surface corresponds to the second pixel attribute, and the y-axis of the mix value surface corresponds to the first pixel attribute, wherein the mix value surface includes a flat region, a transition, and a saturation region corresponding to thresholds and four arbitrary constants associated with the inputs;
wherein the scalar is evaluated from a polynomial and the four arbitrary constants dictate the powers of the polynomial;
code for generating a mix value based on the scalar;
code for blending, based on the mix value, the first pixel and the second pixel, to create a first blended pixel; and
outputting the first blended pixel.

20. A method, comprising:
receiving a first pixel attribute of a first pixel from a first image, wherein the first pixel is located at a pixel position within the first image;
receiving a second pixel attribute of a second pixel from a second image,
wherein the second pixel is located at the pixel position within the second image, and
wherein the first image and the second image are aligned, and wherein the first pixel is brighter than the second pixel;
identifying a scalar based on a mix value surface that receives as inputs the first pixel attribute and the second pixel attribute, wherein the x-axis of the mix value surface corresponds to the second pixel attribute, and the y-axis of the mix value surface corresponds to the first pixel attribute, wherein the mix value surface includes a flat region, a transition region, and a saturation region corresponding to thresholds and four arbitrary constants associated with the inputs; wherein
the scalar is evaluated from a polynomial and the four arbitrary constants dictate the powers of the polynomial;
generating a mix value based on the scalar;
blending, via an image processing circuit, based on the mix value, the first pixel and the second pixel, to create a first blended pixel; and
outputting the first blended pixel.

* * * * *